(12) United States Patent
Raichelgauz et al.

(10) Patent No.: US 12,139,166 B2
(45) Date of Patent: Nov. 12, 2024

(54) CABIN PREFERENCES SETTING THAT IS BASED ON IDENTIFICATION OF ONE OR MORE PERSONS IN THE CABIN

(71) Applicant: AUTOBRAINS TECHNOLOGIES LTD, Tel Aviv (IL)

(72) Inventors: Igal Raichelgauz, Tel Aviv (IL); Karina Odinaev, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 170 days.

(21) Appl. No.: 17/805,852

(22) Filed: Jun. 7, 2022

(65) Prior Publication Data

US 2022/0388538 A1 Dec. 8, 2022

Related U.S. Application Data

(60) Provisional application No. 63/202,353, filed on Jun. 7, 2021.

(51) Int. Cl.
*B60W 60/00* (2020.01)
*B60H 1/00* (2006.01)
(Continued)

(52) U.S. Cl.
CPC ..... *B60W 60/0013* (2020.02); *B60H 1/00735* (2013.01); *B60Q 3/80* (2017.02);
(Continued)

(58) Field of Classification Search
CPC .. B60Q 3/80; B60Q 60/0013; B60H 1/00735; B60R 16/03; B60W 10/30;
(Continued)

(56) References Cited

U.S. PATENT DOCUMENTS 4,601,395 A 7/1986 Juvinall et al.
4,733,353 A 3/1988 Jaswa
(Continued)

FOREIGN PATENT DOCUMENTS

AU 2007201966 B2 2/2010
CN 101539530 A 9/2009
(Continued)

OTHER PUBLICATIONS

"Computer Vision Demonstration Website", Electronics and Computer Science, University of Southampton, 2005, USA.
(Continued)

*Primary Examiner* — Justin S Lee
(74) *Attorney, Agent, or Firm* — Reches Patents

(57) ABSTRACT

A method that may include receiving driving information and environmental metadata indicative of information sensed by the vehicle; detecting multiple driving events encountered during the driving over the path; determining driving events; for each driving event, determining a comfort based autonomous driving pattern information; for each driving event, determining an driving event identifier; and storing in at least one data structure a driving event identifier for each one of the multiple types of driving events, and a comfort based autonomous driving pattern information.

20 Claims, 36 Drawing Sheets

(51) Int. Cl.
*B60Q 3/80* (2017.01)
*B60R 16/037* (2006.01)
*B60W 10/30* (2006.01)

(52) U.S. Cl.
CPC ........... *B60R 16/037* (2013.01); *B60W 10/30* (2013.01); *B60W 2554/802* (2020.02); *B60W 2710/18* (2013.01); *B60W 2710/30* (2013.01); *B60W 2720/10* (2013.01)

(58) Field of Classification Search
CPC ....... B60W 2554/802; B60W 2710/18; B60W 2710/30; B60W 2720/10
See application file for complete search history.

(56) References Cited

U.S. PATENT DOCUMENTS

| | | |
|---|---|---|
| 4,932,645 A | 6/1990 | Schorey et al. |
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,369,773 A | 11/1994 | Hammerstrom |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 5,999,637 A | 12/1999 | Toyoda et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,459,991 B1 | 10/2002 | Takiguchi et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,026,944 B1 | 9/2011 | Sah |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| RE44,963 E | 6/2014 | Shannon |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,235,557 B2 | 1/2016 | Raichelgauz et al. |
| 9,286,623 B2 | 3/2016 | Raichelgauz et al. |
| 9,311,308 B2 | 4/2016 | Sankarasubramaniam et al. |
| 9,323,754 B2 | 4/2016 | Ramanathan et al. |
| 9,392,324 B1 | 7/2016 | Maltar et al. |
| 9,416,499 B2 | 8/2016 | Cronin et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |

(56) References Cited

U.S. PATENT DOCUMENTS

| | | |
|---|---|---|
| 9,807,442 B2 | 10/2017 | Bhatia et al. |
| 9,863,928 B1 | 1/2018 | Peterson et al. |
| 9,875,445 B2 | 1/2018 | Amer et al. |
| 9,953,533 B1 | 4/2018 | Graves |
| 9,953,535 B1 | 4/2018 | Canavor et al. |
| 9,984,369 B2 | 5/2018 | Li et al. |
| 10,048,700 B1 | 8/2018 | Curlander et al. |
| 10,157,291 B1 | 12/2018 | Kenthapadi et al. |
| 10,235,882 B1 | 3/2019 | Aoude et al. |
| 10,253,468 B1 | 4/2019 | Linville et al. |
| 10,395,332 B1 | 8/2019 | Konrardy et al. |
| 10,414,398 B2 | 9/2019 | Ochi |
| 10,416,670 B1 | 9/2019 | Fields et al. |
| 10,417,914 B1 | 9/2019 | Vose et al. |
| 10,467,893 B1 | 11/2019 | Soryal et al. |
| 10,545,023 B1 | 1/2020 | Herbach et al. |
| 10,684,626 B1 | 6/2020 | Martin |
| 10,916,124 B2 | 2/2021 | Geisler |
| 10,922,788 B1 | 2/2021 | Yu et al. |
| 10,967,877 B2 | 4/2021 | Asakura et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0181336 A1 | 12/2002 | Shields |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0145002 A1 | 7/2003 | Kleinberger et al. |
| 2003/0158839 A1 | 8/2003 | Faybishenko et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0257233 A1 | 12/2004 | Proebsting |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0149369 A1 | 7/2005 | Sevdermish |
| 2005/0163375 A1 | 7/2005 | Grady |
| 2005/0172130 A1 | 8/2005 | Roberts |
| 2005/0177372 A1 | 8/2005 | Wang et al. |
| 2005/0193093 A1 | 9/2005 | Mathew et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0074588 A1 | 4/2006 | Blodgett et al. |
| 2006/0080311 A1 | 4/2006 | Potok et al. |
| 2006/0093190 A1 | 5/2006 | Cheng et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Ticken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0267975 A1 | 11/2006 | Moses et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0081088 A1 | 4/2007 | Gotoh et al. |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0282513 A1 | 12/2007 | Michi et al. |
| 2007/0294187 A1 | 12/2007 | Scherrer |
| 2007/0298152 A1 | 12/2007 | Baets |
| 2008/0006615 A1 | 1/2008 | Rosario et al. |
| 2008/0049789 A1 | 2/2008 | Vedantham et al. |
| 2008/0071465 A1 | 3/2008 | Chapman et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0161986 A1 | 7/2008 | Breed |
| 2008/0165018 A1 | 7/2008 | Breed |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228749 A1 | 9/2008 | Brown |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |

(56) References Cited

U.S. PATENT DOCUMENTS

| | | |
|---|---|---|
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0232361 A1 | 9/2009 | Miller |
| 2009/0234878 A1 | 9/2009 | Herz et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0010751 A1 | 1/2010 | Blodgett et al. |
| 2010/0010752 A1 | 1/2010 | Blodgett et al. |
| 2010/0030474 A1 | 2/2010 | Sawada |
| 2010/0035648 A1 | 2/2010 | Huang |
| 2010/0042646 A1 | 2/2010 | Raichelgauz et al. |
| 2010/0049374 A1 | 2/2010 | Ferrin et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0161652 A1 | 6/2010 | Bellare et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0262609 A1 | 10/2010 | Raichelgauz et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0060496 A1 | 3/2011 | Nielsen et al. |
| 2011/0077028 A1 | 3/2011 | Wilkes, III et al. |
| 2011/0164180 A1 | 7/2011 | Lee |
| 2011/0164810 A1 | 7/2011 | Zang et al. |
| 2011/0190972 A1 | 8/2011 | Timmons et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2011/0307542 A1 | 12/2011 | Wang et al. |
| 2012/0041969 A1 | 2/2012 | Priyadarshan et al. |
| 2012/0131454 A1 | 5/2012 | Shah |
| 2012/0136853 A1 | 5/2012 | Kennedy et al. |
| 2012/0155726 A1 | 6/2012 | Li et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0219191 A1 | 8/2012 | Benzarti et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0211705 A1 | 8/2013 | Geelen et al. |
| 2013/0226930 A1 | 8/2013 | Arngren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1 | 2/2014 | Sato et al. |
| 2014/0125703 A1 | 5/2014 | Roveta et al. |
| 2014/0139670 A1 | 5/2014 | Kesavan et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0195093 A1 | 7/2014 | Litkouhi et al. |
| 2014/0198986 A1 | 7/2014 | Marchesotti |
| 2014/0201126 A1 | 7/2014 | Zadeh et al. |
| 2014/0201330 A1 | 7/2014 | Lopez et al. |
| 2014/0236414 A1 | 8/2014 | Droz et al. |
| 2014/0247342 A1 | 9/2014 | Ellenby et al. |
| 2014/0250032 A1 | 9/2014 | Huang et al. |
| 2014/0282655 A1 | 9/2014 | Roberts |
| 2014/0288453 A1 | 9/2014 | Liu et al. |
| 2014/0300722 A1 | 10/2014 | Garcia |
| 2014/0328512 A1 | 11/2014 | Gurwicz et al. |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1 | 2/2015 | Kozloski et al. |
| 2015/0057869 A1 | 2/2015 | Healey et al. |
| 2015/0071457 A1 | 3/2015 | Burciu |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0120760 A1 | 4/2015 | Wang et al. |
| 2015/0123968 A1 | 5/2015 | Holverda et al. |
| 2015/0127516 A1 | 5/2015 | Studnitzer et al. |
| 2015/0130643 A1 | 5/2015 | Nagy |
| 2015/0153735 A1 | 6/2015 | Clarke et al. |
| 2015/0166069 A1 | 6/2015 | Engelman et al. |
| 2015/0190284 A1 | 7/2015 | Censo et al. |
| 2015/0203116 A1 | 7/2015 | Fairgrieve et al. |
| 2015/0213325 A1 | 7/2015 | Krishnamoorthi et al. |
| 2015/0224988 A1 | 8/2015 | Buerkle et al. |
| 2015/0248586 A1 | 9/2015 | Gaidon et al. |
| 2015/0254344 A1 | 9/2015 | Kulkarni et al. |
| 2015/0266455 A1 | 9/2015 | Wilson |
| 2015/0286742 A1 | 10/2015 | Zhang et al. |
| 2015/0286872 A1 | 10/2015 | Medioni et al. |
| 2015/0293976 A1 | 10/2015 | Guo et al. |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0046298 A1 | 2/2016 | Deruyck et al. |
| 2016/0078339 A1 | 3/2016 | Li et al. |
| 2016/0127641 A1 | 5/2016 | Gove |
| 2016/0132194 A1 | 5/2016 | Grue et al. |
| 2016/0133130 A1 | 5/2016 | Grimm et al. |
| 2016/0142625 A1 | 5/2016 | Weksler et al. |
| 2016/0193996 A1 | 7/2016 | Stefan |
| 2016/0221592 A1 | 8/2016 | Puttagunta et al. |
| 2016/0275766 A1 | 9/2016 | Venetianer et al. |
| 2016/0284095 A1 | 9/2016 | Chalom et al. |
| 2016/0302046 A1 | 10/2016 | Velusamy |
| 2016/0306798 A1 | 10/2016 | Guo et al. |
| 2016/0330394 A1 | 11/2016 | Shahraray et al. |
| 2016/0355181 A1 | 12/2016 | Teraoka et al. |
| 2016/0379091 A1 | 12/2016 | Lin et al. |
| 2017/0007521 A1 | 1/2017 | Monsonis et al. |
| 2017/0008521 A1 | 1/2017 | Braunstein et al. |
| 2017/0017638 A1 | 1/2017 | Satyavarta et al. |
| 2017/0018178 A1 | 1/2017 | Poechmueller et al. |
| 2017/0072851 A1 | 3/2017 | Shenoy et al. |

(56) References Cited

U.S. PATENT DOCUMENTS

| | | |
|---|---|---|
| 2017/0075036 A1 | 3/2017 | Pikhletsky et al. |
| 2017/0078621 A1 | 3/2017 | Sahay et al. |
| 2017/0090473 A1 | 3/2017 | Cooper et al. |
| 2017/0092122 A1 | 3/2017 | Sharan |
| 2017/0111576 A1 | 4/2017 | Tojo et al. |
| 2017/0136842 A1 | 5/2017 | Anderson et al. |
| 2017/0154241 A1 | 6/2017 | Shambik et al. |
| 2017/0180623 A1 | 6/2017 | Lin |
| 2017/0243370 A1 | 8/2017 | Hoye et al. |
| 2017/0263128 A1 | 9/2017 | Chandran et al. |
| 2017/0267256 A1* | 9/2017 | Minster ............... B60W 40/09 |
| 2017/0293296 A1 | 10/2017 | Stenneth et al. |
| 2017/0297401 A1 | 10/2017 | Hrovat et al. |
| 2017/0344023 A1 | 11/2017 | Laubinger et al. |
| 2017/0351268 A1 | 12/2017 | Anderson et al. |
| 2018/0022361 A1 | 1/2018 | Rao et al. |
| 2018/0025235 A1 | 1/2018 | Fridman |
| 2018/0046869 A1 | 2/2018 | Cordell et al. |
| 2018/0060690 A1 | 3/2018 | Lee et al. |
| 2018/0061253 A1 | 3/2018 | Hyun |
| 2018/0082591 A1 | 3/2018 | Pandy |
| 2018/0101177 A1 | 4/2018 | Cohen |
| 2018/0108258 A1 | 4/2018 | Dilger |
| 2018/0113461 A1 | 4/2018 | Potnis et al. |
| 2018/0144640 A1 | 5/2018 | Price et al. |
| 2018/0151073 A1 | 5/2018 | Minemura et al. |
| 2018/0157666 A1 | 6/2018 | Raichelgauz et al. |
| 2018/0157903 A1 | 6/2018 | Tu et al. |
| 2018/0170392 A1 | 6/2018 | Yang et al. |
| 2018/0174001 A1 | 6/2018 | Kang |
| 2018/0188731 A1 | 7/2018 | Matthiesen et al. |
| 2018/0188746 A1 | 7/2018 | Esher et al. |
| 2018/0189613 A1 | 7/2018 | Wolf et al. |
| 2018/0204335 A1 | 7/2018 | Agata et al. |
| 2018/0210462 A1 | 7/2018 | Switkes et al. |
| 2018/0218608 A1 | 8/2018 | Offenhaeuser et al. |
| 2018/0222414 A1* | 8/2018 | Ihlenburg ........... B60H 1/00657 |
| 2018/0268292 A1 | 9/2018 | Choi et al. |
| 2018/0338229 A1 | 11/2018 | Nemec et al. |
| 2018/0354505 A1 | 12/2018 | Meier et al. |
| 2018/0356817 A1 | 12/2018 | Poeppel |
| 2018/0373929 A1 | 12/2018 | Ye |
| 2019/0034764 A1 | 1/2019 | Oh et al. |
| 2019/0064929 A1 | 2/2019 | Tomeh et al. |
| 2019/0071093 A1 | 3/2019 | Ma et al. |
| 2019/0072965 A1 | 3/2019 | Zhang et al. |
| 2019/0072966 A1 | 3/2019 | Zhang et al. |
| 2019/0073908 A1 | 3/2019 | Neubecker et al. |
| 2019/0088135 A1 | 3/2019 | Do et al. |
| 2019/0096135 A1 | 3/2019 | Mutto et al. |
| 2019/0139419 A1 | 5/2019 | Wendt et al. |
| 2019/0147259 A1 | 5/2019 | Molin et al. |
| 2019/0163204 A1 | 5/2019 | Bai et al. |
| 2019/0171912 A1 | 6/2019 | Vallespi-Gonzalez et al. |
| 2019/0193751 A1 | 6/2019 | Fernando et al. |
| 2019/0196471 A1 | 6/2019 | Vaughn et al. |
| 2019/0205798 A1 | 7/2019 | Rosas-Maxemin et al. |
| 2019/0213324 A1 | 7/2019 | Thorn |
| 2019/0220011 A1 | 7/2019 | Penna |
| 2019/0225214 A1 | 7/2019 | Pohl et al. |
| 2019/0246042 A1 | 8/2019 | Liu |
| 2019/0253614 A1 | 8/2019 | Oleson et al. |
| 2019/0279046 A1 | 9/2019 | Han et al. |
| 2019/0279293 A1 | 9/2019 | Tang et al. |
| 2019/0287515 A1 | 9/2019 | Li et al. |
| 2019/0291720 A1 | 9/2019 | Xiao et al. |
| 2019/0304102 A1 | 10/2019 | Chen et al. |
| 2019/0311226 A1 | 10/2019 | Xiao et al. |
| 2019/0315346 A1 | 10/2019 | Yoo et al. |
| 2019/0337521 A1 | 11/2019 | Stauber |
| 2019/0340924 A1 | 11/2019 | Abari et al. |
| 2019/0347492 A1 | 11/2019 | Morimura et al. |
| 2019/0355132 A1 | 11/2019 | Kushleyev et al. |
| 2019/0378006 A1 | 12/2019 | Fukuda et al. |
| 2019/0384303 A1 | 12/2019 | Muller et al. |
| 2019/0392831 A1 | 12/2019 | Pohl |
| 2020/0012871 A1 | 1/2020 | Lee et al. |
| 2020/0027002 A1 | 1/2020 | Hickson et al. |
| 2020/0027351 A1 | 1/2020 | Gotoda et al. |
| 2020/0027355 A1 | 1/2020 | Sujan et al. |
| 2020/0053262 A1 | 2/2020 | Wexler et al. |
| 2020/0074326 A1 | 3/2020 | Balakrishnan et al. |
| 2020/0086881 A1 | 3/2020 | Abendroth et al. |
| 2020/0090426 A1 | 3/2020 | Barnes et al. |
| 2020/0110982 A1 | 4/2020 | Gou et al. |
| 2020/0117902 A1 | 4/2020 | Wexler et al. |
| 2020/0120267 A1 | 4/2020 | Netto et al. |
| 2020/0125927 A1 | 4/2020 | Kim |
| 2020/0156784 A1 | 5/2020 | Carnell |
| 2020/0175384 A1 | 6/2020 | Zhang et al. |
| 2020/0175550 A1 | 6/2020 | Raichelgauz et al. |
| 2020/0269864 A1 | 8/2020 | Zhang et al. |
| 2020/0272940 A1 | 8/2020 | Sun et al. |
| 2020/0293035 A1 | 9/2020 | Sakurada et al. |
| 2020/0302295 A1 | 9/2020 | Tung et al. |
| 2020/0304707 A1 | 9/2020 | Williams et al. |
| 2020/0324778 A1 | 10/2020 | Diamond et al. |
| 2020/0370890 A1 | 11/2020 | Hamilton et al. |
| 2020/0371518 A1 | 11/2020 | Kang |
| 2020/0410322 A1 | 12/2020 | Naphade et al. |
| 2021/0009270 A1 | 1/2021 | Chen et al. |
| 2021/0041248 A1 | 2/2021 | Li et al. |
| 2021/0049908 A1 | 2/2021 | Pipe et al. |
| 2021/0055741 A1 | 2/2021 | Kawanai et al. |
| 2021/0056492 A1 | 2/2021 | Zass |
| 2021/0056852 A1 | 2/2021 | Lund et al. |
| 2021/0061298 A1* | 3/2021 | Balachandran ...... A61B 5/14551 |
| 2021/0070339 A1* | 3/2021 | Delgatty ............... B60N 3/104 |
| 2021/0096565 A1 | 4/2021 | Xie et al. |
| 2021/0097309 A1 | 4/2021 | Kaku et al. |
| 2021/0097408 A1* | 4/2021 | Sicconi ................. G06N 20/00 |
| 2021/0148831 A1 | 5/2021 | Raichelgauz et al. |
| 2021/0164177 A1 | 6/2021 | Wientjes |
| 2021/0182539 A1 | 6/2021 | Rassool |
| 2021/0192357 A1 | 6/2021 | Sinha et al. |
| 2021/0209332 A1 | 7/2021 | Nishio et al. |
| 2021/0224917 A1 | 7/2021 | Gaudin et al. |
| 2021/0248904 A1 | 8/2021 | Nguyen |
| 2021/0266437 A1 | 8/2021 | Wexler et al. |
| 2021/0272207 A1 | 9/2021 | Fields et al. |
| 2021/0284183 A1 | 9/2021 | Marenco et al. |
| 2021/0284191 A1 | 9/2021 | Raichelgauz et al. |
| 2021/0300430 A1* | 9/2021 | Kang .................... G06N 20/00 |
| 2021/0316747 A1 | 10/2021 | Klein |
| 2021/0334234 A1* | 10/2021 | Yudanov ............... G06F 9/5016 |
| 2021/0390351 A1 | 12/2021 | Romain, II |
| 2021/0390840 A1 | 12/2021 | Rejal et al. |
| 2021/0409593 A1 | 12/2021 | Zacharias et al. |
| 2022/0005291 A1 | 1/2022 | Konrardy et al. |
| 2022/0038620 A1 | 2/2022 | Demers |
| 2022/0058393 A1 | 2/2022 | Calvert et al. |
| 2022/0126864 A1 | 4/2022 | Moustafa et al. |
| 2022/0161815 A1 | 5/2022 | Beek et al. |
| 2022/0187847 A1 | 6/2022 | Cella et al. |
| 2022/0191389 A1 | 6/2022 | Lei |
| 2022/0234501 A1 | 7/2022 | Odinaev et al. |
| 2022/0286603 A1 | 9/2022 | Lv et al. |
| 2022/0327886 A1 | 10/2022 | Mathur et al. |
| 2022/0345621 A1 | 10/2022 | Shi et al. |

FOREIGN PATENT DOCUMENTS

| | | |
|---|---|---|
| CN | 107472252 B | 4/2022 |
| CN | 111866468 B | 6/2022 |
| DE | 102012009297 A1 | 12/2012 |
| DE | 102016122686 A1 | 5/2018 |
| EP | 1085464 A3 | 1/2007 |
| EP | 3910540 A1 | 11/2021 |
| JP | 2018511807 A | 4/2018 |
| WO | 0231764 A2 | 4/2002 |
| WO | 2003067467 A1 | 8/2003 |
| WO | 2005027457 A1 | 3/2005 |
| WO | 2007049282 A2 | 5/2007 |
| WO | 2014076002 A1 | 5/2014 |

(56) References Cited

FOREIGN PATENT DOCUMENTS

| WO | 2014137337 A1 | 9/2014 | | |
|---|---|---|---|---|
| WO | 2014141282 A1 | 9/2014 | | |
| WO | 2016040376 A1 | 3/2016 | | |
| WO | 2016070193 A1 | 5/2016 | | |
| WO | 2018035145 A1 | 2/2018 | | |
| WO | 2018132088 A1 | 7/2018 | | |
| WO | WO-2020205597 A1 | * 10/2020 | ......... | B60W 30/182 |

OTHER PUBLICATIONS

Boari et al., "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).

Cernansky et al., "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al., "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al., "Recognition of Fractal Images Using a Neural Network", Lecture Notes in Computer Science, 1993, vol. 6861, 1993, pp. 631-637.

Galvane, Quentin, et al. "Automated cinematography with unmanned aerial vehicles." arXiv preprint arXiv:1712.04353 (2017). (Year: 2017).

Garcia, "Solving the Weighted Region Least Cost Path Problem Using Transputers", Naval Postgraduate School, Monterey, California, Dec. 1989.

Guo et al., AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al., "A Multi-Computer Neural Network Architecture in a Virtual Sensor System Application", International journal of knowledge-based intelligent engineering systems, 4 (2). pp. 86-93, 133N 1327-2314.

Hu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).

Huang, Chong, et al. "One-shot imitation filming of human motion videos." arXiv preprint arXiv:1912.10609 (2019). (Year: 2019).

J. Chen and P. Carr, "Mimicking Human Camera Operators," 2015 IEEE Winter Conference on Applications of Computer Vision, 2015, pp. 215-222, doi: 10.1109/WACV.2015.36. (Year: 2015).

Johnson et al., "Pulse-Coupled Neural Nets: Translation, Rotation, Scale, Distortion, and Intensity Signal Invariance for Images", Applied Optics, vol. 33, No. 26, 1994, pp. 6239-6253.

Joubert, Niels, et al. "Towards a drone cinematographer: Guiding quadrotor cameras using visual composition principles." arXivpreprint arXiv: 1610.01691 (2016). (Year: 2916).

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).

Lin et al., "Generating robust digital signature for image/video authentication", Multimedia and Security Workshop at ACM Multimedia '98, Bristol, U.K., Sep. 1998, pp. 245-251.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

M. Gschwindt,, "Can a Robot Become a Movie Director? Learning Artistic Principles for Aerial Cinematography," 2019 EEE/RSJw International Conference on Intelligent Robots and Systems (IROS), 2019, pp. 1107-1114, doi: 10.1109/ROS40897.2019.896759 (Year: 2019).

May et al, "The Transputer", Springer-Verlag Berlin Heidelberg 1989, vol. 41.

McMamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al., "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al., "Cliques in Neural Ensembles as Perception Carriers", Technion—Institute of Technology, 2006 International Joint Conference on neural Networks, Canada, 2006, pp. 285-292.

Ortiz-Boyer et al., "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Retrieval, Story. Ehsan Younessian. Diss. Nanyang Technological University, 2013: i-187 (Year: 2013).

Rui, Yong et al. "Relevance feedback: a power tool for interactive content-based image retrieval." IEEE Transactions on circuits and systems for video technology 8.5 (1998): 644-655.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al., "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al., "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al.("Hibrid-Soc: A Multi-Core Soc Architecture for Multimedia Signal Processing" 2003).

Stolberg et al., "Hibrid-Soc: A Mul ti-Core Soc Architecture for Mul timedia Signal Processing", 2003 IEEE, pp. 189-194.

(56) References Cited

OTHER PUBLICATIONS

Theodoropoulos et al., "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Vallet, David, et al. "Personalized content retrieval in context using ontological knowledge." IEEE Transactions on circuits andsystems for video technology 17.3 (2007): 336-346. (Year: 2007).
Verstraeten et al., "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al., "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al., "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Yanai, Generic Image Classification Using Visual Knowledge on the Web, pp. 167-174 (Year: 2003).
Zhou et al., "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al., "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.

\* cited by examiner

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

CABIN PREFERENCES SETTING THAT IS BASED ON IDENTIFICATION OF ONE OR MORE PERSONS IN THE CABIN

BACKGROUND

An autonomous driving system is expected to control, in the near future, an autonomous vehicle in an autonomous manner.

A driving pattern applied by the autonomous driving system may cause a certain human within the vehicle to be uncomfortable.

This may cause various users not to purchase an autonomous vehicle and/or may cause automatic driving system vendors to develop sub-optimal driving patterns.

There is a growing need to provide a method, system and non-transitory computer readable medium for providing better driving patterns.

SUMMARY

There may be provided a method for comfort based autonomous driving, the method may include receiving, from vehicles, multiple driving event metadata or generating the multiple driving event metadata; wherein the multiple driving event metadata may be related to multiple driving events; wherein each driving event metadata may be associated to a driving event and comprises (a) environmental metadata regarding an environment of the vehicle that may be related to the driving event, and (b) physical metadata indicative of at least one physical parameter of the vehicle that may be related to the driving event; generating driving event identifiers for identifying each driving event; evaluating one or more impact parameters for each driving event, wherein the evaluating may be responsive to the physical metadata related to the driving event, wherein the one or more impact parameters may be indicative of an impact of the driving event on a person located within a vehicle; receiving or generating one or more allowable values of the one or more impact parameters, the one or more allowable values represent an allowable comfort of the person; determining, based on the one or more allowable values of the one or more impact parameters, comfort based autonomous driving pattern information, wherein the comfort based autonomous driving pattern information may be indicative of a comfort based autonomous driving pattern to be applied by the vehicle during an occurrence of the driving event; and storing in at least one data structure (a) the driving event identifiers, and (b) comfort based autonomous driving pattern information for each one of the driving events.

The one or more physical parameters may be selected out of speed, acceleration, displacement, and direction of propagation.

The generating the multiple driving event metadata may include (i) receiving, from the vehicles, environmental information and physical information acquired by the vehicles during various time windows, (ii) detecting multiple driving events that occurred during the time windows, and (iii) extracting the environmental information and physical information acquired by the vehicles during the driving events.

The method may include generating the one or more allowable values of the one or more impact parameters may be based on a statistical analysis of driving patterns applied by the multiple vehicle during the driving events.

The method may include generating the one or more allowable values of the one or more impact parameters may be based on typical driving patterns applied by the multiple vehicle during the driving events.

The method may include generating the one or more allowable values of the one or more impact parameters may be based on feedback from at least one person within at least one of the multiple vehicles.

The method may include generating the one or more allowable values of the one or more impact parameters may be based on a monitoring process that involve monitoring at least one response of at least one person within at least one of the multiple vehicles to at least one of the multiple driving events.

The multiple driving events may be related to obstacles.

The multiple driving events may be related to physical obstacles.

The multiple driving events may be related to weather conditions.

The allowable comfort of the person may be represented by one or more comfort threshold.

The determining of the comfort based autonomous driving pattern information, may be responsive to a plurality of allowable values of a plurality of impact parameters.

There may be provided a non-transitory computer readable medium that stores instructions for: receiving, from vehicles, multiple driving event metadata or generating the multiple driving event metadata; wherein the multiple driving event metadata may be related to multiple driving events; wherein each driving event metadata may be associated to a driving event and may include (a) environmental metadata regarding an environment of the vehicle that may be related to the driving event, and (b) physical metadata indicative of at least one physical parameter of the vehicle that may be related to the driving event; generating driving event identifiers for identifying each driving event; evaluating one or more impact parameters for each driving event, wherein the evaluating may be responsive to the physical metadata related to the driving event, wherein the one or more impact parameters may be indicative of an impact of the driving event on a person located within a vehicle; receiving or generating one or more allowable values of the one or more impact parameters, the one or more allowable values represent an allowable comfort of the person; determining, based on the one or more allowable values of the one or more impact parameters, comfort based autonomous driving pattern information, wherein the comfort based autonomous driving pattern information may be indicative of a comfort based autonomous driving pattern to be applied by the vehicle during an occurrence of the driving event; and storing in at least one data structure (a) the driving event identifiers, and (b) comfort based autonomous driving pattern information for each one of the driving events.

The one or more physical parameters may be selected out of speed, acceleration, displacement, and direction of propagation.

The generating of the multiple driving event metadata may include (i) receiving, from the vehicles, environmental information and physical information acquired by the vehicles during various time windows, (ii) detecting multiple driving events that occurred during the time windows, and (iii) extracting the environmental information and physical information acquired by the vehicles during the driving events.

The non-transitory computer readable medium may store instructions for generating the one or more allowable values of the one or more impact parameters may be based on a statistical analysis of driving patterns applied by the multiple vehicle during the driving events.

The non-transitory computer readable medium may store instructions for generating the one or more allowable values of the one or more impact parameters may be based on typical driving patterns applied by the multiple vehicle during the driving events.

The non-transitory computer readable medium may store instructions for generating the one or more allowable values of the one or more impact parameters may be based on feedback from at least one person within at least one of the multiple vehicles.

The non-transitory computer readable medium may include may store instructions for generating the one or more allowable values of the one or more impact parameters may be based on a monitoring process that involve monitoring at least one response of at least one person within at least one of the multiple vehicles to at least one of the multiple driving events.

The multiple driving events may be related to obstacles.

The multiple driving events may be related to physical obstacles.

The multiple driving events may be related to weather conditions.

The allowable comfort of the person may be represented by one or more comfort threshold.

The determining of the comfort based autonomous driving pattern information, may be responsive to a plurality of allowable values of a plurality of impact parameters.

There may be provided a method for driving a vehicle, the method may include receiving, by the vehicle, multiple driving event identifiers related to multiple types of driving events that occurred during a driving of the vehicle over a path, and (b) comfort based autonomous driving pattern information for each one of the multiple types of driving events; wherein a comfort based autonomous driving pattern information of an driving event may be indicative of a comfort based autonomous driving pattern associated to the driving event; sensing, by the vehicle and while driving on a current path, currently sensed information that may be indicative of a vicinity of the vehicle and may be indicative of a current path; searching, based on the currently sensed information, for a driving event identifier out of the multiple driving event identifiers; when detecting an driving event then applying an autonomous driving pattern that may be associated to the driving event.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1A:
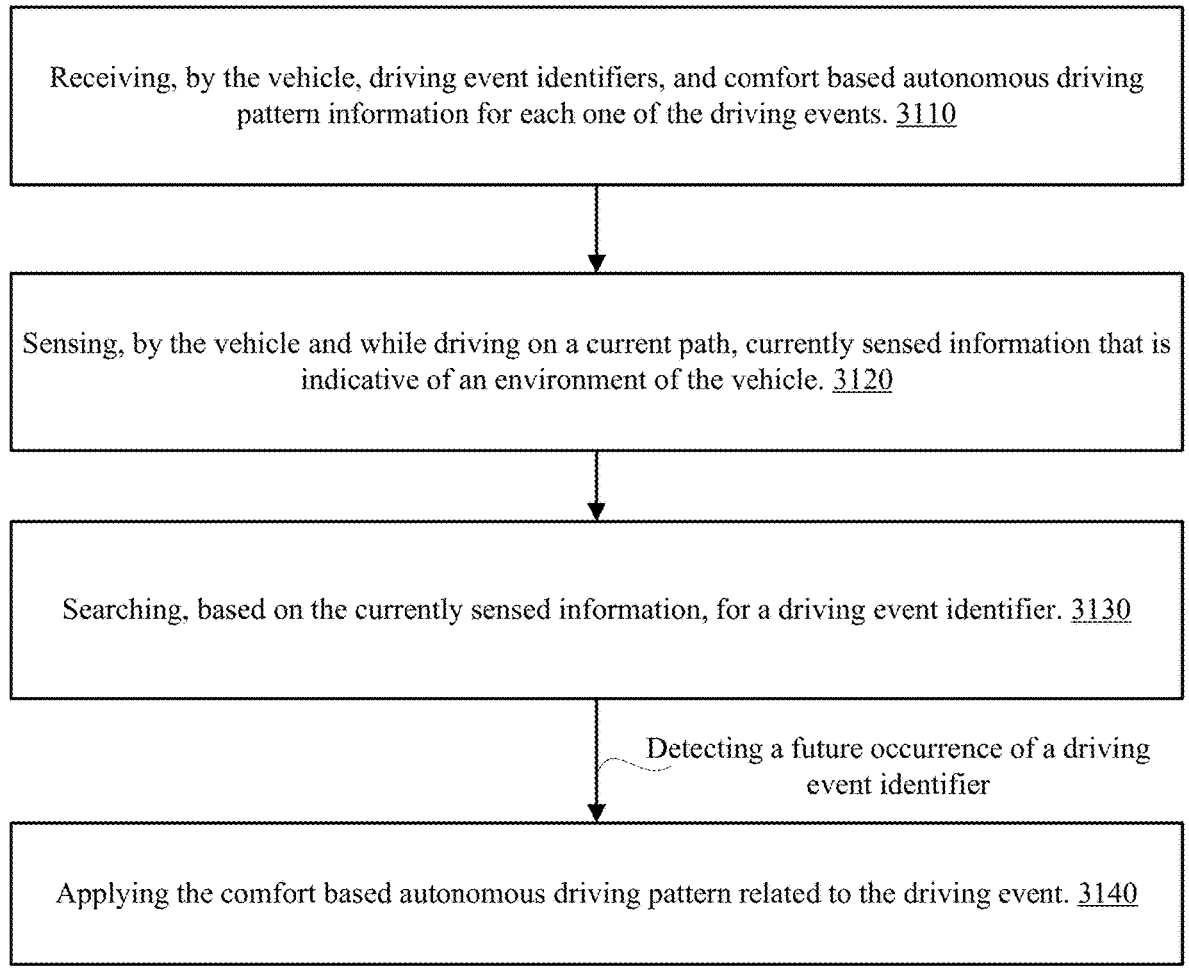
FIGS. 1A, 1B, 1C, 2A, 2B, 2C and 3 illustrate examples of methods.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, method and non-transitory computer readable medium that adjusts the autonomous driving pattern to a desired comfort level of one or more persons within a vehicle. The adjustment can be done in an automatic manner (without human intervention) and especially in an unsupervised manner—thus providing a highly efficient and accurate manner to tailor the autonomous driving patterns.

A driving event may be a passage of an obstacle, a bypassing of an obstacle, driving at certain weather condition, driving in a curved section of a road, reacting to a presence of a zebra crossing, driving towards a crossroad, driving in a roundabout, a change in any driving parameter (acceleration, direction of propagation), turning the vehicle, bypassing a vehicle, parking, entering a scene that required a driver intervention, performing complex driving maneuvers, any driving event related to the driving that may cause a person within the vehicle to feel uncomfortable, and/or any combination of any one of the above. For example—a driving event may involve passing a bumper at a certain velocity, passing a bumper under a certain amount of rain, passing a bumper and entering a hole, and the like.

Driving events may be classified or partitioned to driving event types. Driving events of the same type may share a common attribute. For example—passing different bumps of similar structure may belong to the same type of driving events, passing the same bump at different speeds may be regarded as the same type of driving events, passing bumps located at different locations may be regarded as driving events of the same type, and the like.

FIG. 1A illustrate method 3000 for comfort based autonomous driving.

Method 3000 may be applied by a computerized system that is a remote computerized system (not located in a vehicle) or a computerized system located in one or more vehicle. For example—multiple vehicle computers located within multiple vehicles can participate in the execution of the method.

Method 3000 may start by step 3010 of receiving, from vehicles, multiple driving event metadata or generating the multiple driving event metadata.

The multiple driving event metadata is related to multiple driving events.

Each driving event metadata is associated to a driving event and includes (a) environmental metadata regarding an environment of the vehicle that is related to the driving event, and (b) physical metadata indicative of at least one physical parameter of the vehicle that is related to the driving event.

The environments metadata may represent sensed information about the environment of the vehicle—including the road or path segments that are contacted by the vehicle, as well as the surrounding of the vehicle, any object or element that can be seen or otherwise sensed by one or more vehicle sensors.

The physical metadata may represent sensed information about forces, pressures, acceleration, displacement, direction of propagation, turns, and the like.

The driving event metadata may be sensed by one or more sensors out of visual sensors, acoustic sensor, audio sensors, infrared sensor, cameras, radars, sonars, LIDAR modules, accelerators, shock sensors, velocity sensors, telemetry sensors and any sensor that monitors the operation of one or more vehicle component (such as brakes, suspension, motor, gear, driving wheel, and the like) that may directly or indirectly indicate about the driving event.

When step 3010 includes receiving the multiple driving event metadata then a vehicle that sends a driving event metadata detects the occurrence of the driving event and transmits the metadata related to the driving event.

When step 3010 includes generating the driving event metadata then the vehicles that experiences the driving event either are unaware of the occurrence of the driving event or from any other reason do not allocate resources for generating the driving event metadata.

The generating of the multiple driving event metadata may include (i) receiving, from the vehicles, environmental information and physical information acquired by the vehicles during various time windows, (ii) detecting multiple driving events that occurred during the time windows, and (iii) extracting the environmental information and physical information acquired by the vehicles during the driving events.

Step 3010 may be followed by steps 3020 and 3030.

Step 3030 may include generating driving event identifiers for identifying each driving event. A driving event identifier will enable a vehicle to identity a driving event—preferably before the driving event occurs—in order to allow the vehicle to respond to future occurrence of the driving event in a manner that complies with a desired comfort level.

Step 3030 may include evaluating one or more impact parameters for each driving event. The valuating is responsive to the physical metadata related to the driving event. The one or more impact parameters are indicative of an impact of the driving event on a person located within a vehicle.

The one or more impact parameters may be directly measured by one or more sensors that sense the impact on a person within a vehicle (for example—one or more sensors located within a seat of the vehicle, attached to a seat of the vehicle, attached to a safety belt, and the like), and/or may be indirectly measured by sensors located elsewhere in the vehicle.

The indirect measurement may involve converting a measurement related to a vehicle component that does not contact a person of a vehicle (for example—a shock measured by a shock absorber sensor) to an impact parameter. This can be done using a model of the vehicle, or a mapping between the indirect measurement and the impact parameter. The mapping may learnt during a testing period, by comparing readings of indirect sensors and direct sensors (that directly measure the impact), by receiving feedback from persons, and the like.

Method 3000 may also include step 3040 of receiving or generating one or more allowable values of the one or more impact parameters, the one or more allowable values represent an allowable comfort of the person.

The one or more allowable values of the one or more impact parameters may be generated based on a statistical analysis of driving patterns applied by the multiple vehicle during the driving events.

For example—it may be assumed that most drivers (or at least a certain amount of drivers—for example 30%, 40%, 50%) will drive in a manner corresponds to an allowable comfort of the driver. Thus—typical values (or patterns) of the one or more impact parameters (or more moderate values) may represent one or more impact parameters of one or more allowable values.

Yet for another example—the generating of the one or more allowable values of the impact parameter may include calculating the distribution of values of one or more impact parameters and selecting a range of impact parameter values that represent calmer driving patterns.

For example—the driving event may be passing a bumper and the impact parameter may be an acceleration felt by a person within the vehicle when passing the bumper. The distribution of acceleration values (felt by a person when passing a bumper). The generating of the one or more allowable values may include selecting one or more allowable values acceleration values that are either (a) typical, (b) lower by a certain amount (or certain degree) than typical, (c) located within a predefined percentile of the distribution, (b) about an average of the acceleration values, (d) below the average acceleration value, and the like.

Yet for another example—the driving event may be passing a bumper and the impact parameter may be an displacement (for example vertical displacement) felt by a person within the vehicle when passing the bumper. The distribution of displacement values (felt by a person when passing a bumper). The generating of the one or more allowable values may include selecting one or more allowable values displacement values that are either (a) typical, (b) lower by a certain amount (or certain degree) than typical, (c) located within a predefined percentile of the distribution, (b) about an average of the displacement values, (d) below the average displacement value, and the like.

It should be noted that step 3040 may include generating a combination of one or more allowable values of the one or more impact parameters. Thus—the person in the vehicle will feel comfortable when experiencing a combination of different impact parameter values—for example—when passing a bump the displacement should not exceed X centimeters (or be within a certain range) and the acceleration should not exceed Y m/s² (or be within a certain range).

Step 3040 may be based, at least in part, on feedback from at least one person within at least one of the multiple vehicles and/or by monitoring one or more persons in the vehicle. The feedback and/or the monitoring may include receiving and/or detecting gestures (such as grabbing the safety belt, grabbing another element of the vehicle, performing any gesture that is indicative of inconvenience), screaming, requesting the driver to slow down, providing input to a man machine interface of the vehicle, providing input after exiting the vehicle, pressing the brakes when the vehicle is driving at an autonomous mode, exhibiting one or more face expressions, and the like.

The monitoring may include monitoring after one or more physiological parameters of one or more persons such as heart rate, respiration, blood pressure, and the like. These parameters may be indicative of the comfort level of the person.

Steps 3030 and 3040 may be followed by step 3050 of determining, based on the one or more allowable values of the one or more impact parameters, comfort based autonomous driving pattern information, the comfort based autonomous driving pattern information is indicative of a comfort based autonomous driving pattern to be applied by the vehicle during an occurrence of the driving event and even before the occurrence of the driving event.

The comfort based autonomous driving pattern should guarantee that during the driving event a person within the vehicle is comfortable—that the one or more one or more impact parameters are of an allowable value.

The comfort based autonomous driving pattern related to a driving event may involve adjusting the driving of the vehicle before the occurrence of the driving event so that during the driving event the one or more impact parameters have one or more allowable values.

When the future occurrence of the driving event is detected the vehicle is driven in a certain manner—and has a current driving parameters—for example has a certain acceleration, speed and/or direction of driving. The current driving parameters may be changed before the occurrence of the driving event so that during the driving event the one or more impact parameters have one or more allowable values.

For example—the speed and/or acceleration and/or the direction of driving should be sent (or determined) before the occurrence of the driving event. The comfort based autonomous driving pattern is set to perform these changes (if required).

For example—if a certain bumper may be passed at a certain speed (for example—20 km/h) and at certain acceleration (for example—0 m/s²), and if the vehicle detects the obstacle at a certain distance (for example 100 meters) in advance which driving at another speed (for example 40 km/h) and at another acceleration (for example 1 m/s²)—then the comfort based autonomous driving pattern should change the velocity of the vehicle (for example slow from 40 km/h to 20 km/h) and change the acceleration (when reaching the bumper) before reaching the bumper. Step 3050 may determine the required change and the manner in which the change is implemented.

Step 3050 may be responsive to at least one other autonomous driving rule related to a driving of the vehicle during an autonomous driving mode.

The at least one other autonomous driving rule may be a safety rule. For example—the safety rule may limit a speed of the vehicle, may limit an acceleration of the vehicle, may increase a required distance between vehicles, and the like.

The at least one other autonomous driving rule may be a power consumption rule. The power consumption rule may limit some maneuvers that may involve a higher than desired power consumption of the vehicle.

The at least one other autonomous driving rule may be a default driving pattern that should have been applied by the autonomous driving system at the absence of method 3000.

The at least one other autonomous driving rule may be a human intervention policy of a vehicle that may define certain criteria human intervention such as the danger level of a situation, the complexity of the situation (especially complexity of maneuvers required to overcome the situation), the potential damage that may result to the vehicle, driver or surroundings due to the situation. A human intervention policy of a vehicle may also define certain situations that require human intervention—such as specific locations (for example near a cross road of a school), or specific content (near a school bus), and the like.

Step 3050 may be followed by step 3060 of responding to the determining.

Step 3060 may include at least one out of:
  storing in at least one data structure (a) the driving event identifiers, and (b) comfort based autonomous driving pattern information for each one of the driving events.
  Transmitting to one or more vehicles (a) the driving event identifiers, and (b) comfort based autonomous driving pattern information for each one of the driving events.
  Requesting a vehicle to apply the comfort based autonomous driving pattern.
  Instructing a vehicle to apply the comfort based autonomous driving pattern.

Figure 1B:
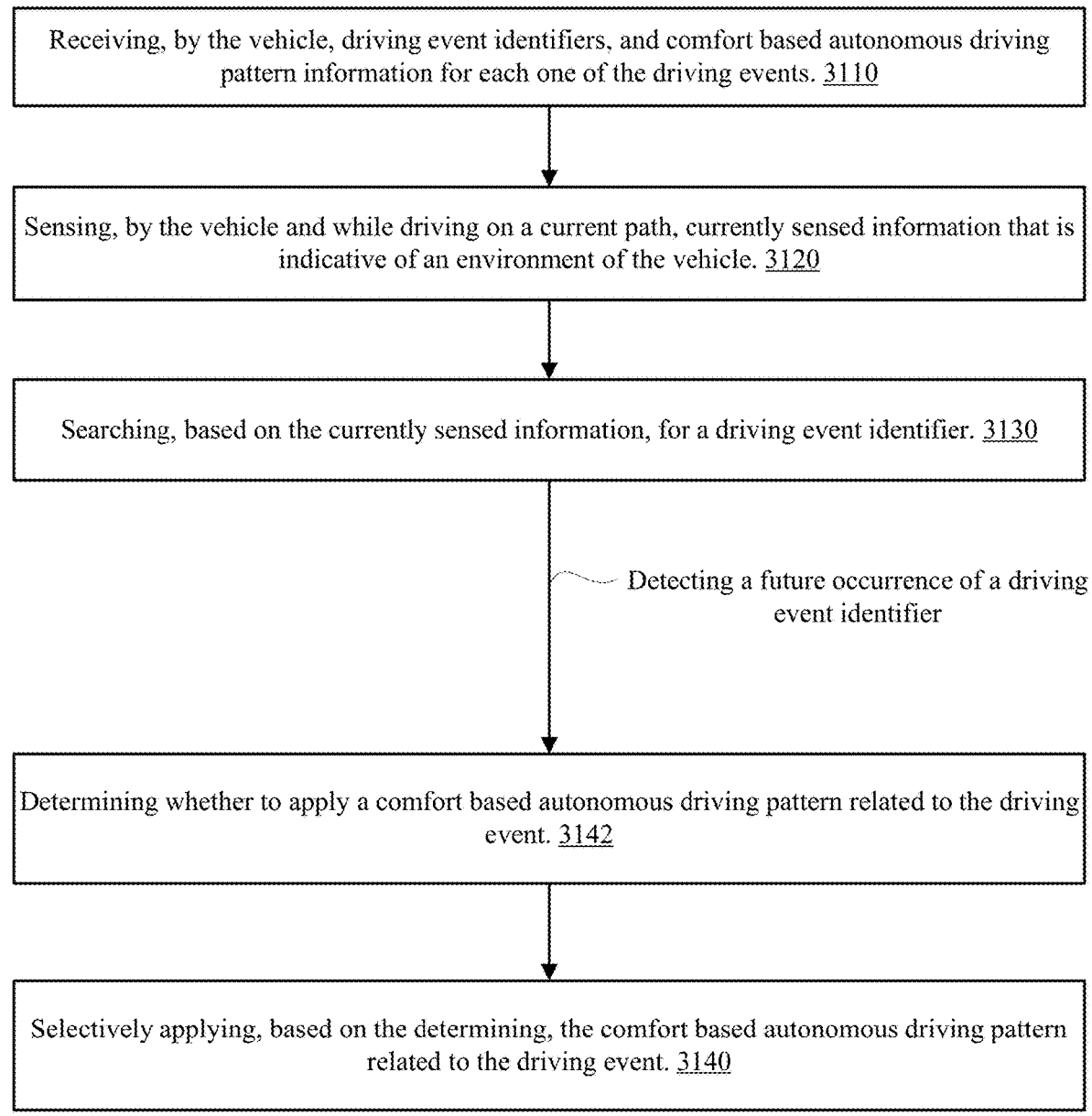

FIG. 1B illustrates method 3100 for driving a vehicle.

Method 3100 may start by step 3110 of receiving, by the vehicle, driving event identifiers, and comfort based autonomous driving pattern information for each one of the driving events.

Step 3110 may be followed by step 3120 of sensing, by the vehicle and while driving on a current path, currently sensed information that is indicative of an environment of the vehicle.

Step 3120 may be followed by step 3130 of searching, based on the currently sensed information, for a driving event identifier.

When detecting a future occurrence of a driving event then step 3130 is followed by step 3140 of applying the comfort based autonomous driving pattern related to the driving event.

Once the driving event ends (this should be detected by the vehicle) the autonomous driving system may apply another autonomous driving pattern.

Figure 1C:
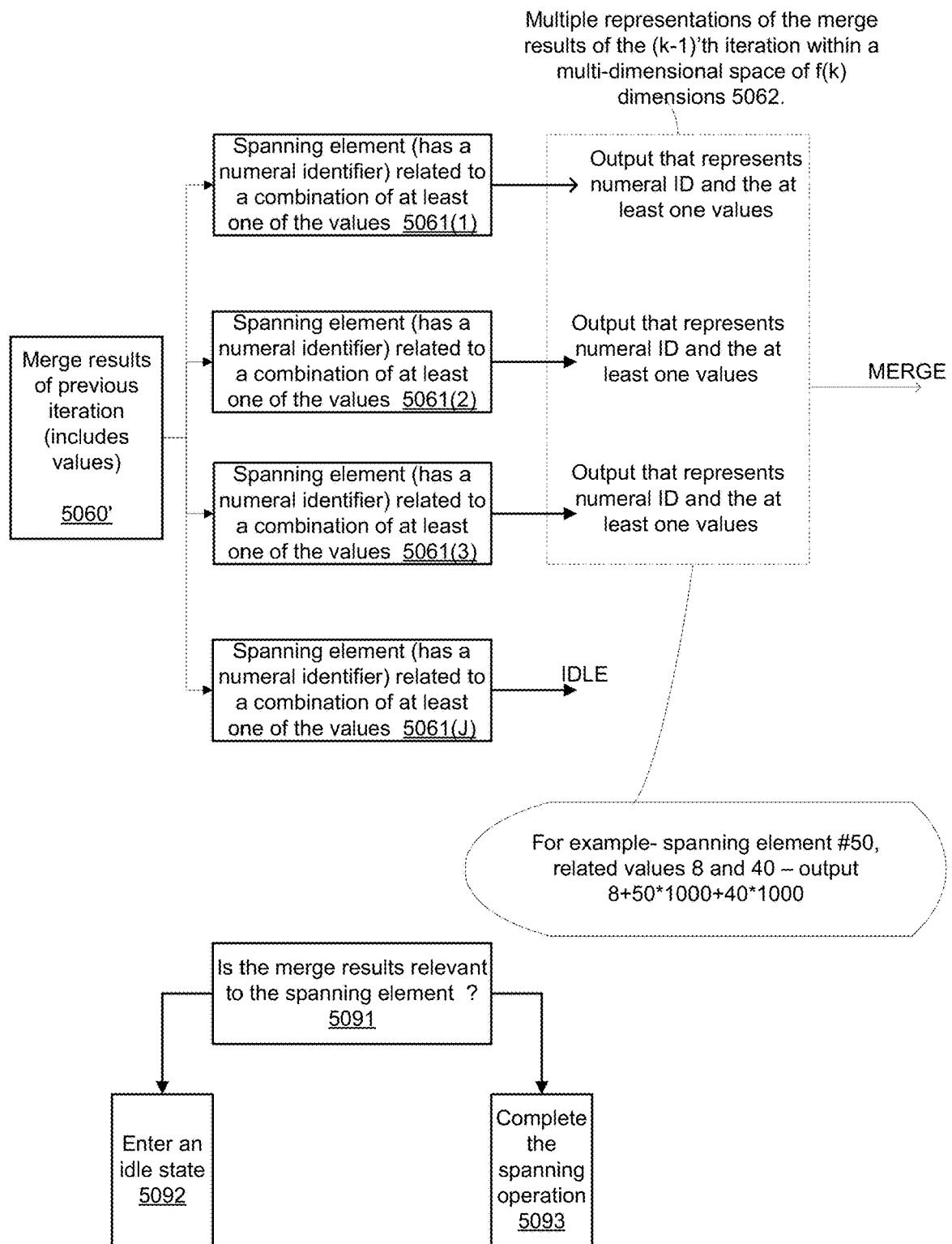
Figure 1E:
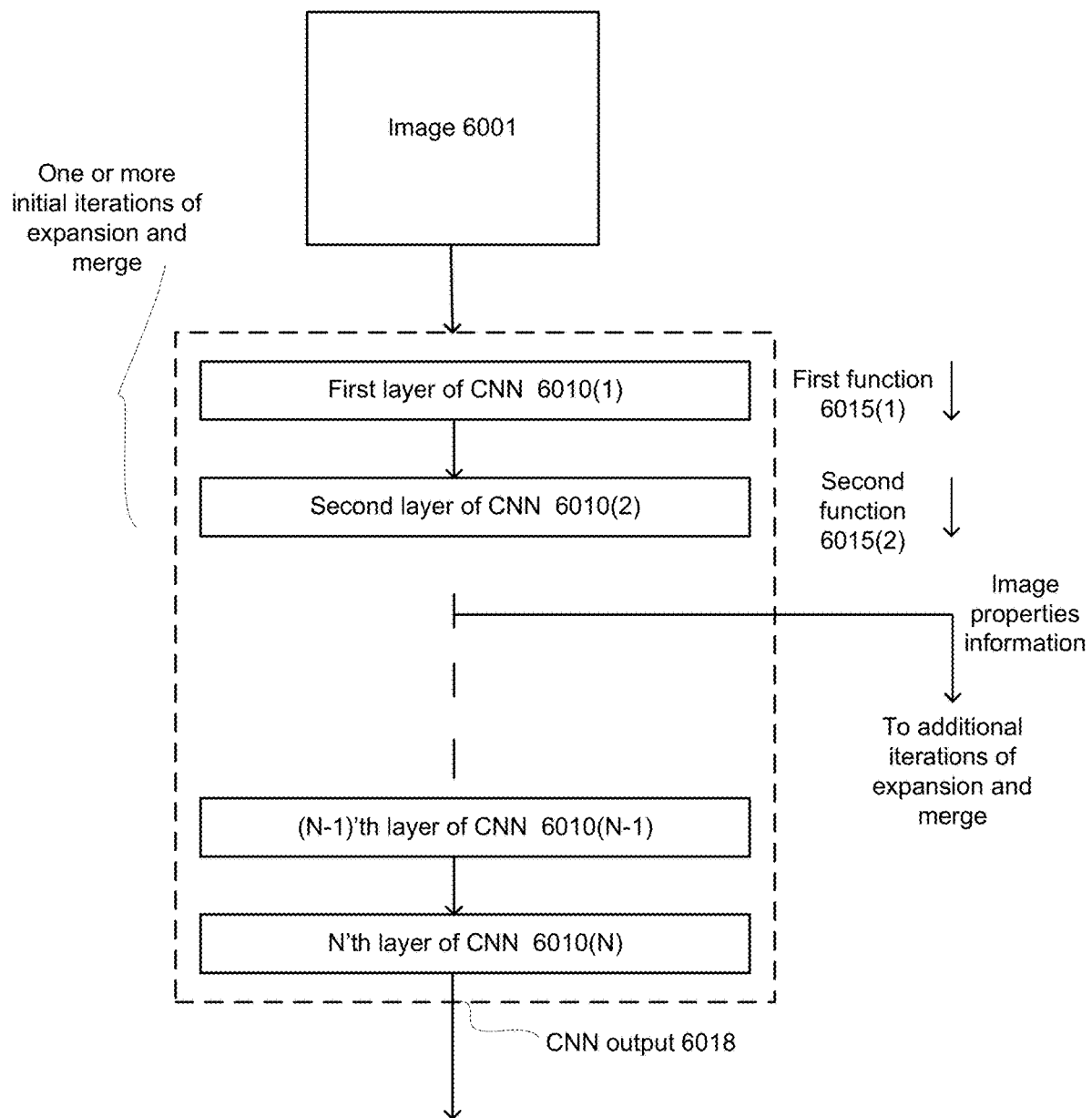
Figure 1F:
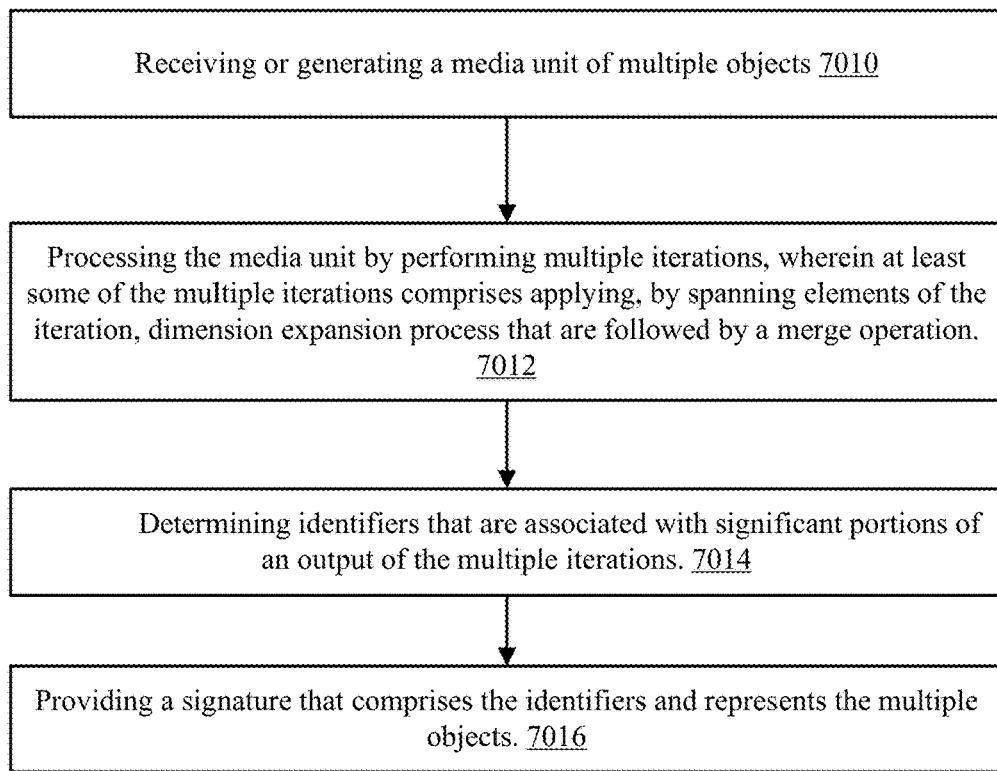
Figure 1G:
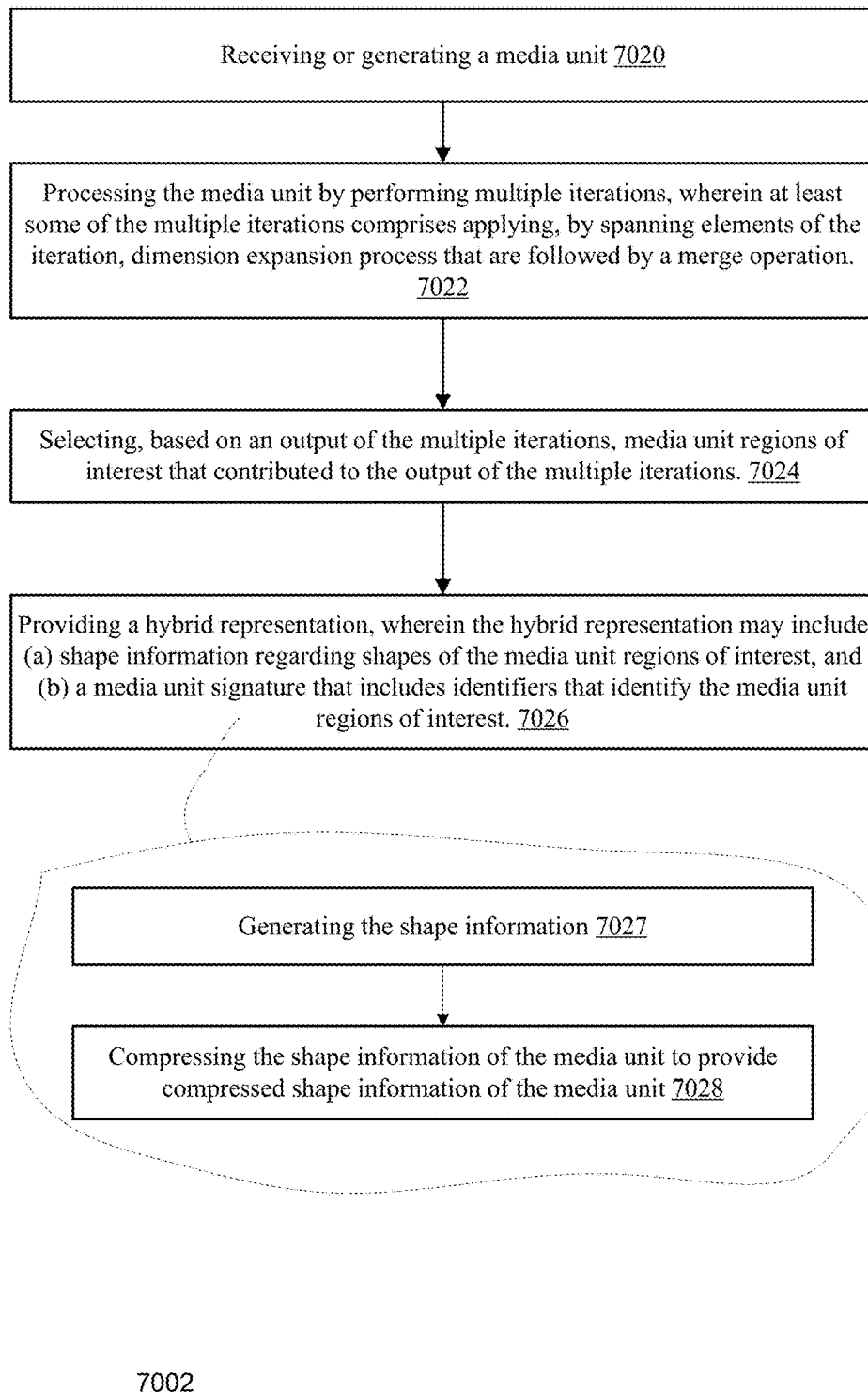
Figure 1H:
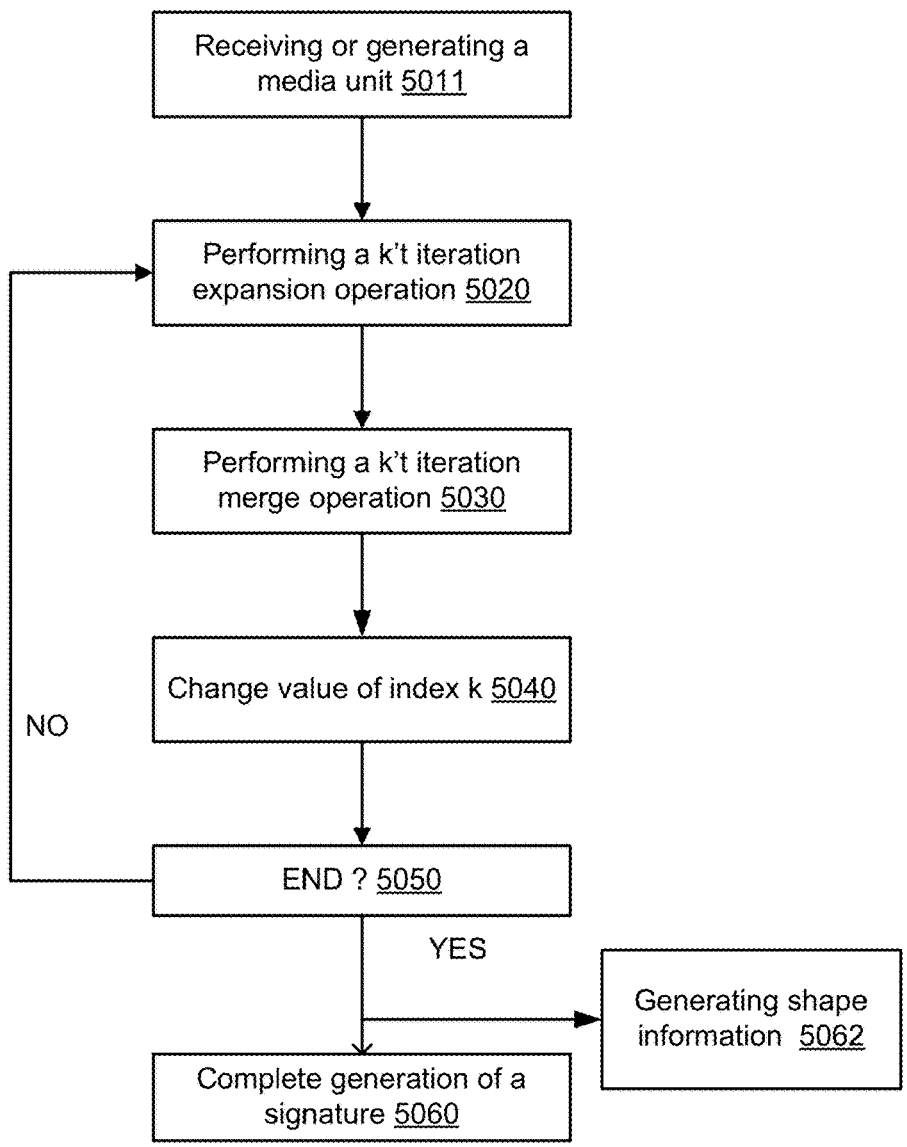
Figure 1I:
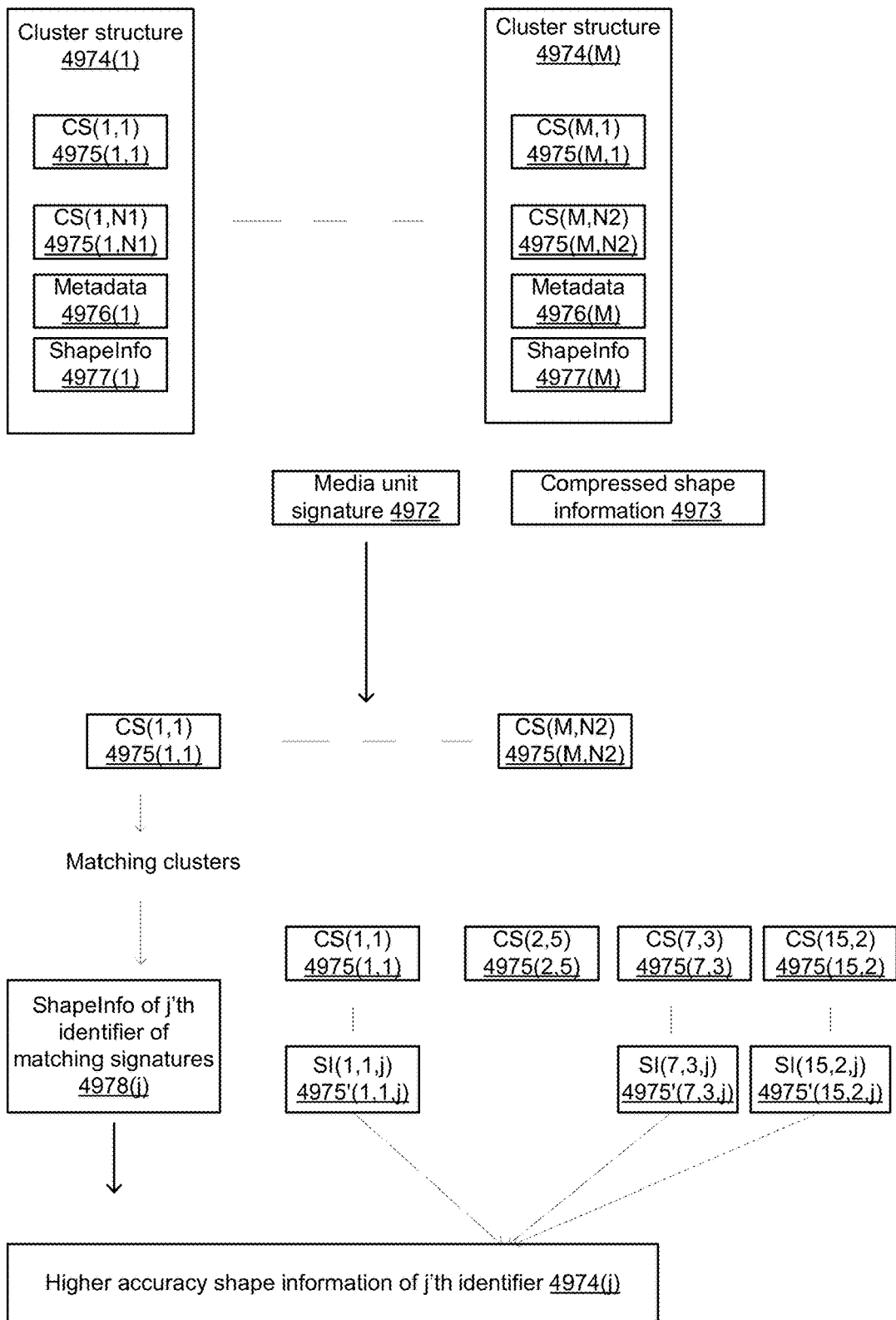
Figure 1J:
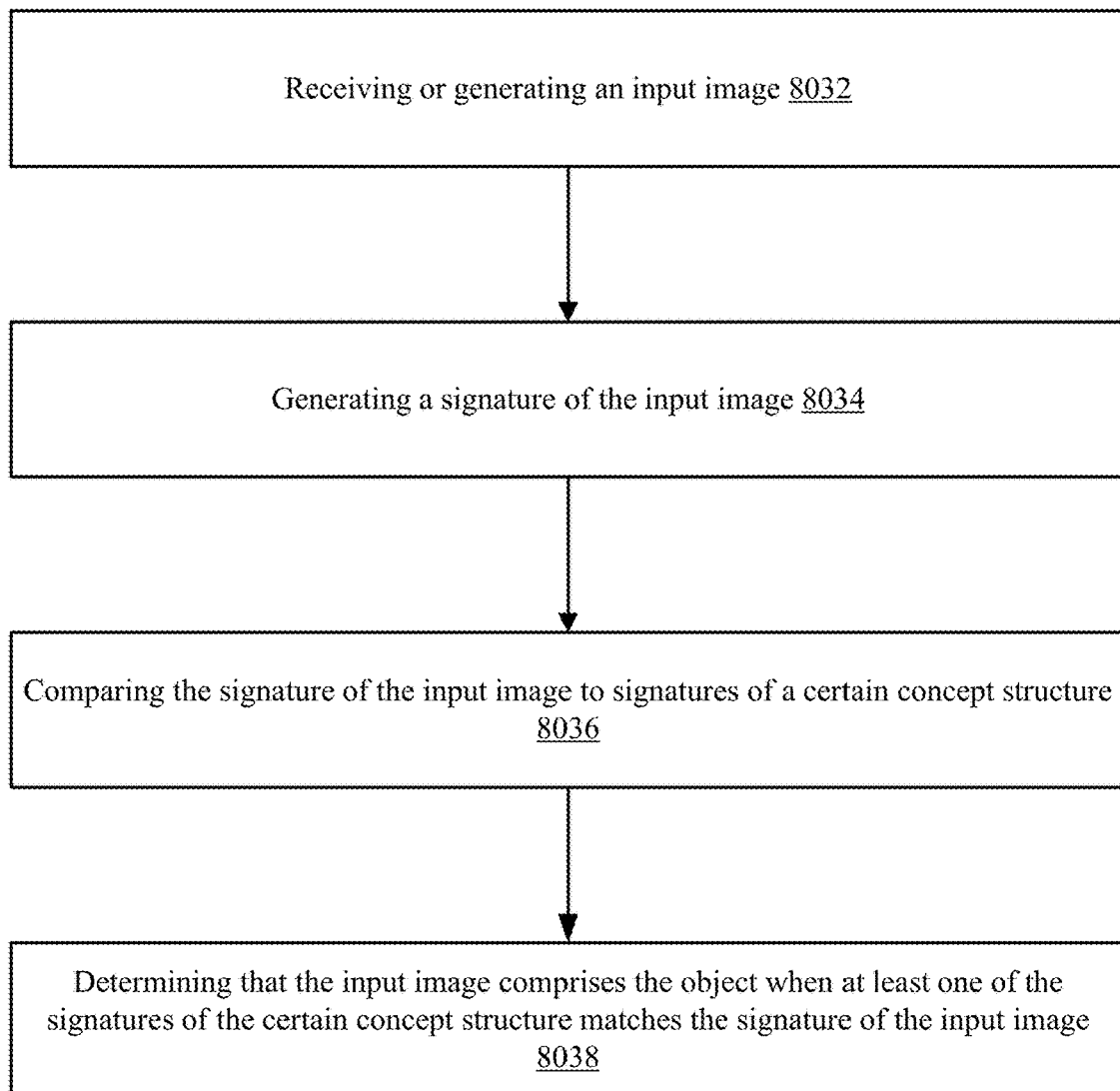
Figure 1K:
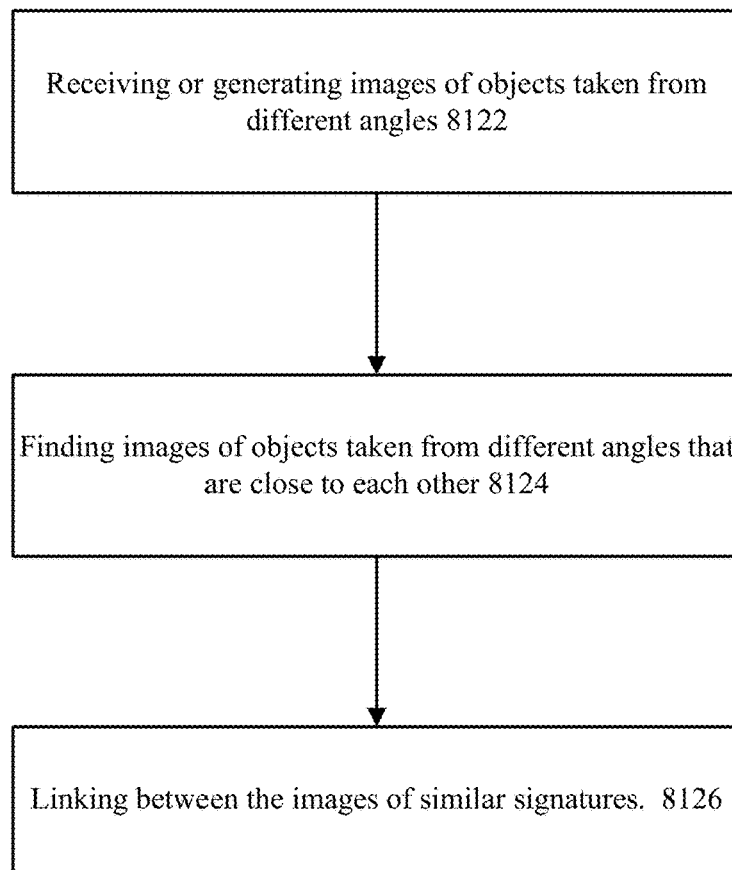
Figure 1L:
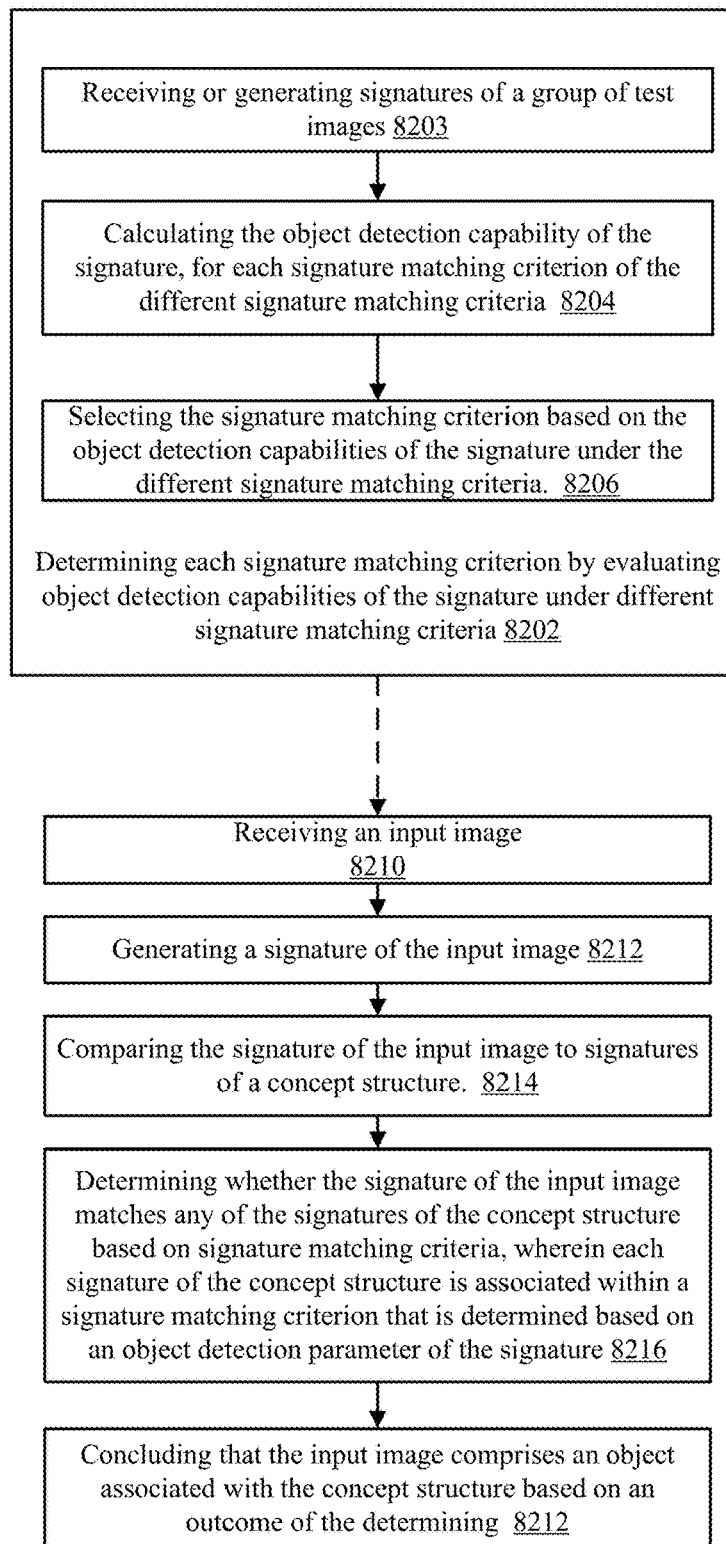
Figure 1M:
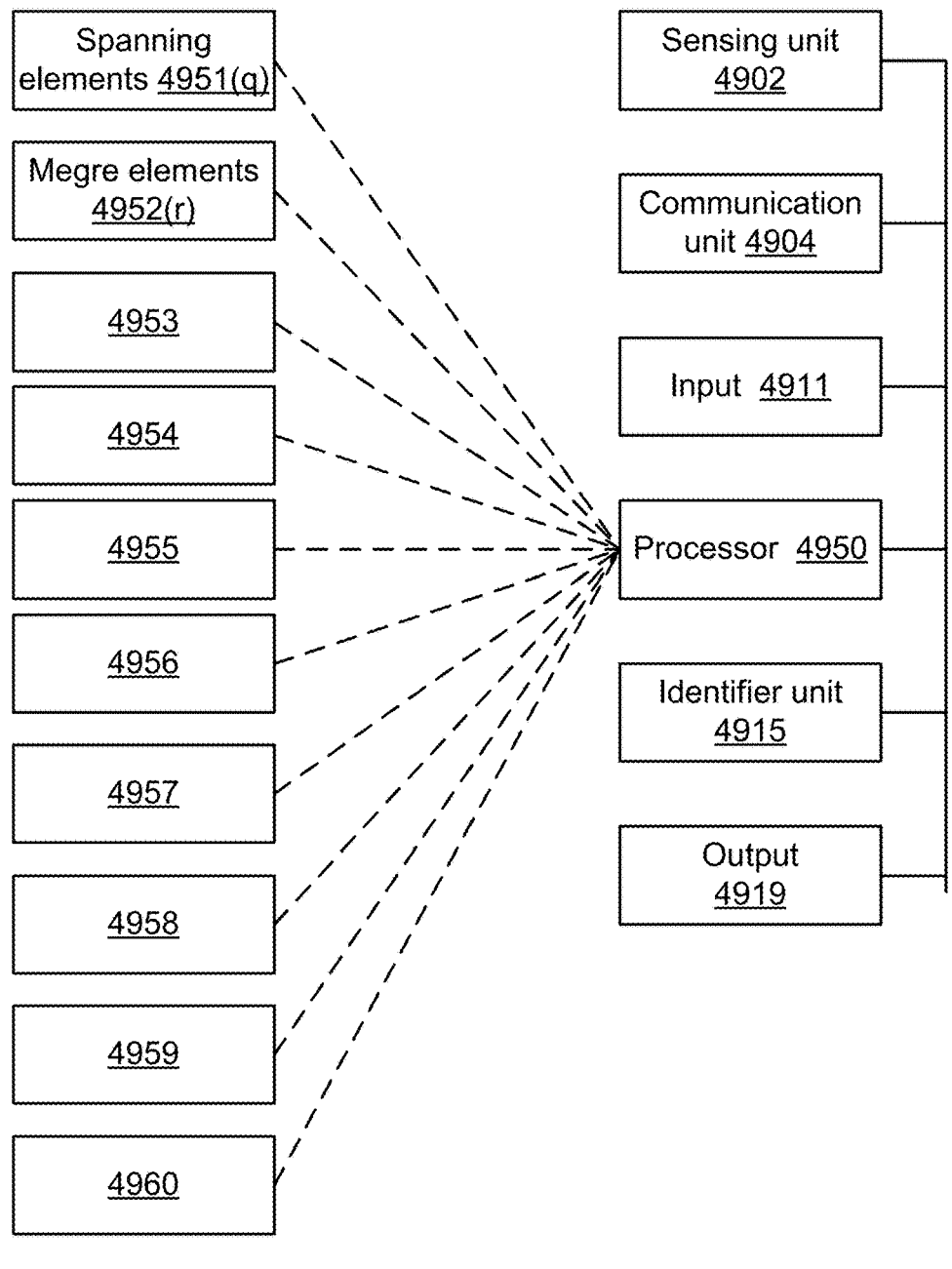
Figure 1N:
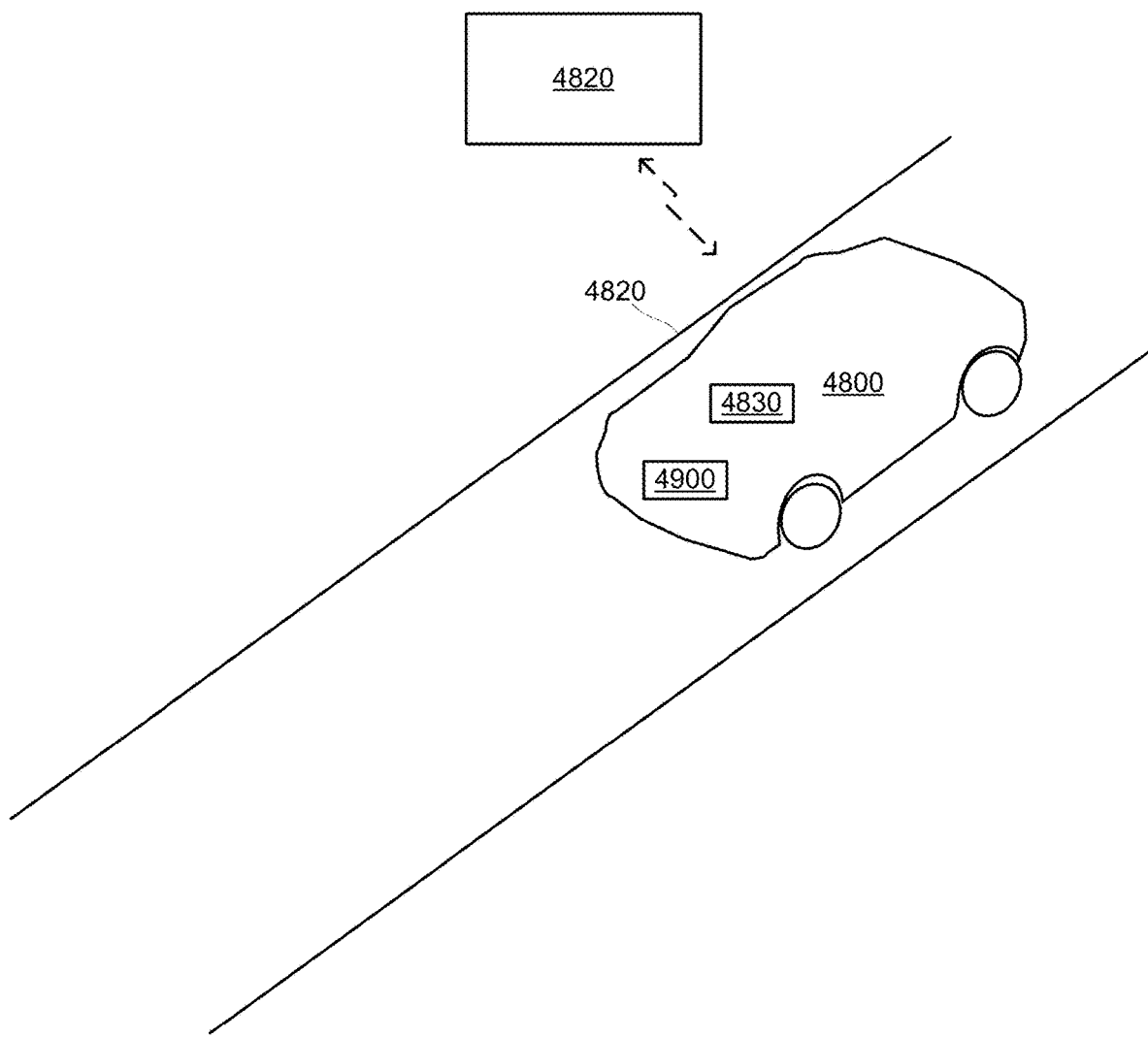

FIG. 1C illustrates method 3102 for driving a vehicle.

Method 3102 may start by step 3110 of receiving, driving event identifiers, and comfort based autonomous driving pattern information for each one of the driving events.

Step 3110 may be followed by step 3120 of sensing, by the vehicle and while driving on a current path, currently sensed information that is indicative of an environment of the vehicle.

Step 3120 may be followed by step 3130 of searching, based on the currently sensed information, for a driving event identifier.

When detecting a future occurrence of a driving event then step 3130 is followed by step 3142 of determining whether to apply a comfort based autonomous driving pattern related to the driving event.

Step 3142 may be followed by step 3144 of selectively applying, based on the determining, the comfort based autonomous driving pattern related to the driving event.

Step 3144 may include:
If determining not to apply the comfort based autonomous driving pattern related to the driving event than another autonomous driving pattern (for example a default one) may be applied.
If determining to apply the comfort based autonomous driving pattern related to the driving event then applying the comfort based autonomous driving pattern related to the driving event.

Step 3142 may be responsive to at least one other autonomous driving rule related to a driving of the vehicle during an autonomous driving mode.

The at least one other autonomous driving rule may be a safety rule. For example—the safety rule may limit a speed of the vehicle, may limit an acceleration of the vehicle, may increase a required distance between vehicles, and the like.

The at least one other autonomous driving rule may be a power consumption rule. The power consumption rule may limit some maneuvers that may involve a higher than desired power consumption of the vehicle.

The at least one other autonomous driving rule may be a default driving pattern that should have been applied by the autonomous driving system at the absence of method 3102.

Step 3142 may also be responsive to input provided by the user—for example the user may determine whether (and how) to apply the comfort based autonomous driving pattern related to the driving event.

Step 3142 may also be based on environmental conditions—for example—change in the visibility and/or humidity and/or rain or snow may affect the decision.

Figure 2A:
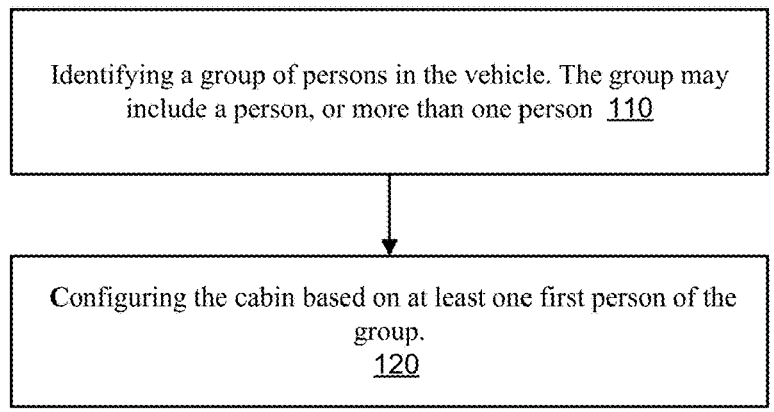
Figure 2B:
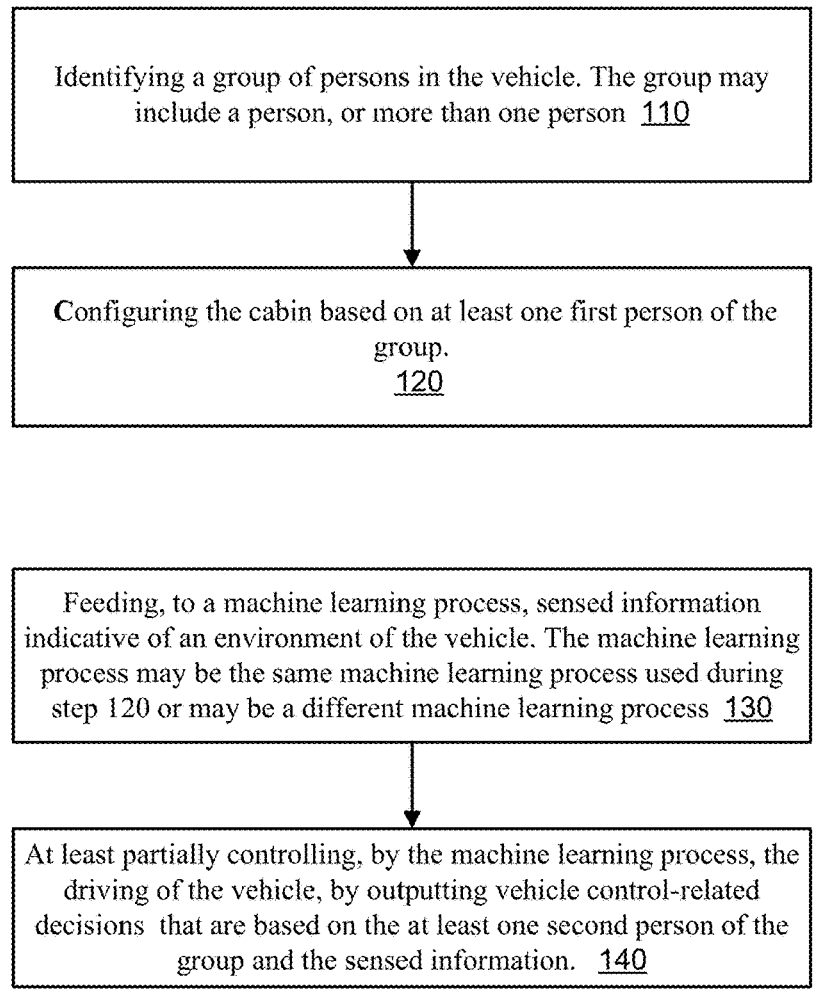
Figure 2C:
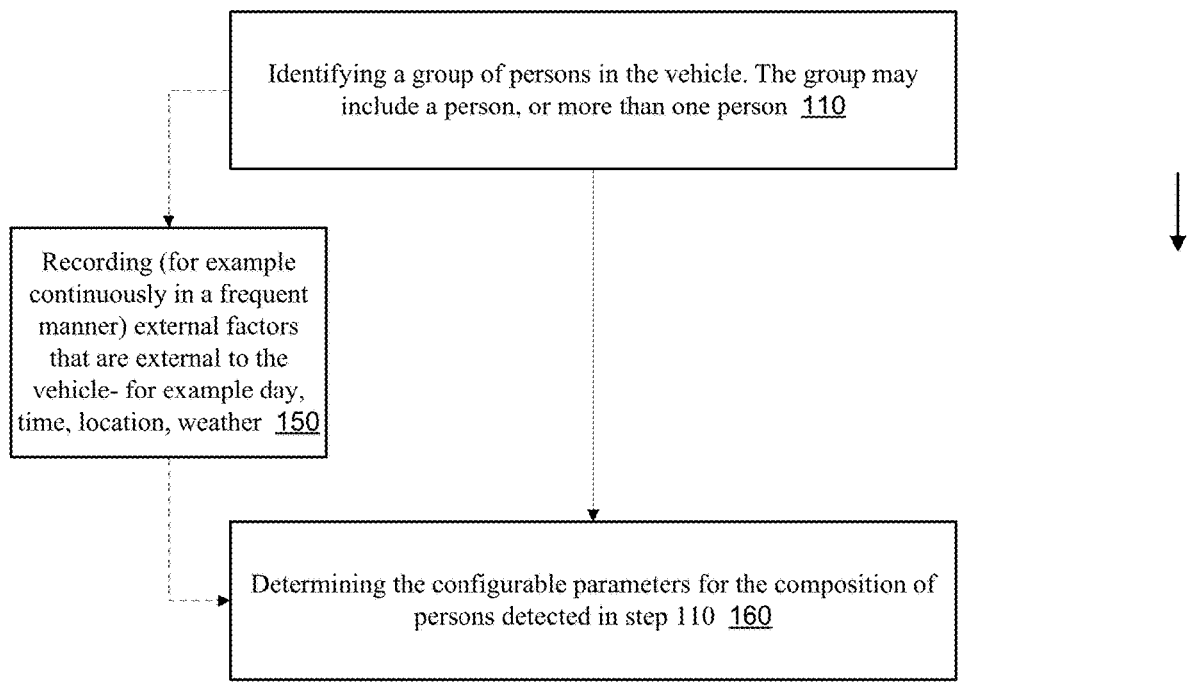
Figure 3:
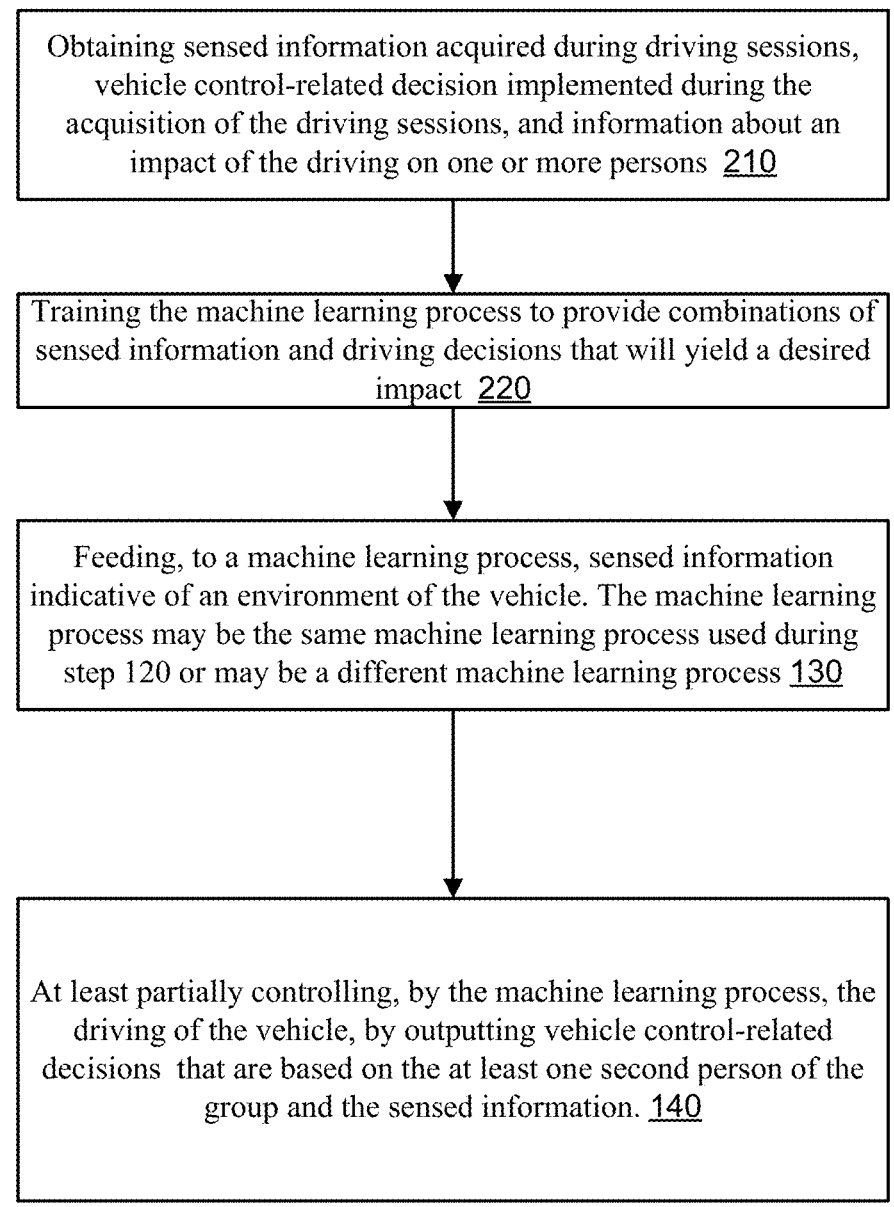

It should be noted that there may be more than one driver of the vehicle and that different autonomous driving pattern related to The driving event may be learnt (per driver) and applied. FIG. 2A illustrates an example of method 100 that includes step 110 of identifying a group of persons in the vehicle. The group may include a person, or more than one person. Step 110 is followed by step 120 of configuring the cabin based on at least one first person of the group. FIG. 2B illustrates an example of method 101 that includes steps 110 and 120. Method 101 also includes step 130 of feeding, to a machine learning process, sensed information indicative of the environment of the vehicle. The machine learning process may be the same machine learning process used during step 120 or may be a different machine learning process. Step 130 is followed by step 140 of at least partially controlling, by the machine learning process, the driving of the vehicle by outputting vehicle control-related decisions that are based on the at least one second person of the group and the sensed information. FIG. 2C illustrates an example of method 103 that includes step 110 of identifying a group of persons in the vehicle. The group may include a person, or more than one person. Step 110 is followed by steps 150 and 160. Step 160 includes determining the configurable parameters for the composition of persons detected in step 111. Step 150 is followed by step 160 and includes Recording (for example continuously in a frequent manner) external factors that are external to the vehicle—for example day, time, location, weather. FIG. 3 illustrates an example of method 105. Method 105 includes a sequence of steps 210, 220, 230 and 140. Step 210 includes obtaining sensed information acquired during driving sessions, vehicle control-related decision implemented during the acquisition of the driving sessions, and information about an impact of the driving on one or more persons. Step 220 includes training the machine learning process to provide combinations of sensed information and driving decisions that will yield a desired impact. Step 130 includes Feeding, to a machine learning process, sensed indicative of an environment of the vehicle. The machine learning process may be the same machine learning process used during step 120 or may be a different machine learning process. Step 140 includes At least partially controlling, by the machine learning process, the driving of the vehicle, by outputting vehicle control-related decisions that are based on the at least one second person of the group and the sensed information.

Figure 4:
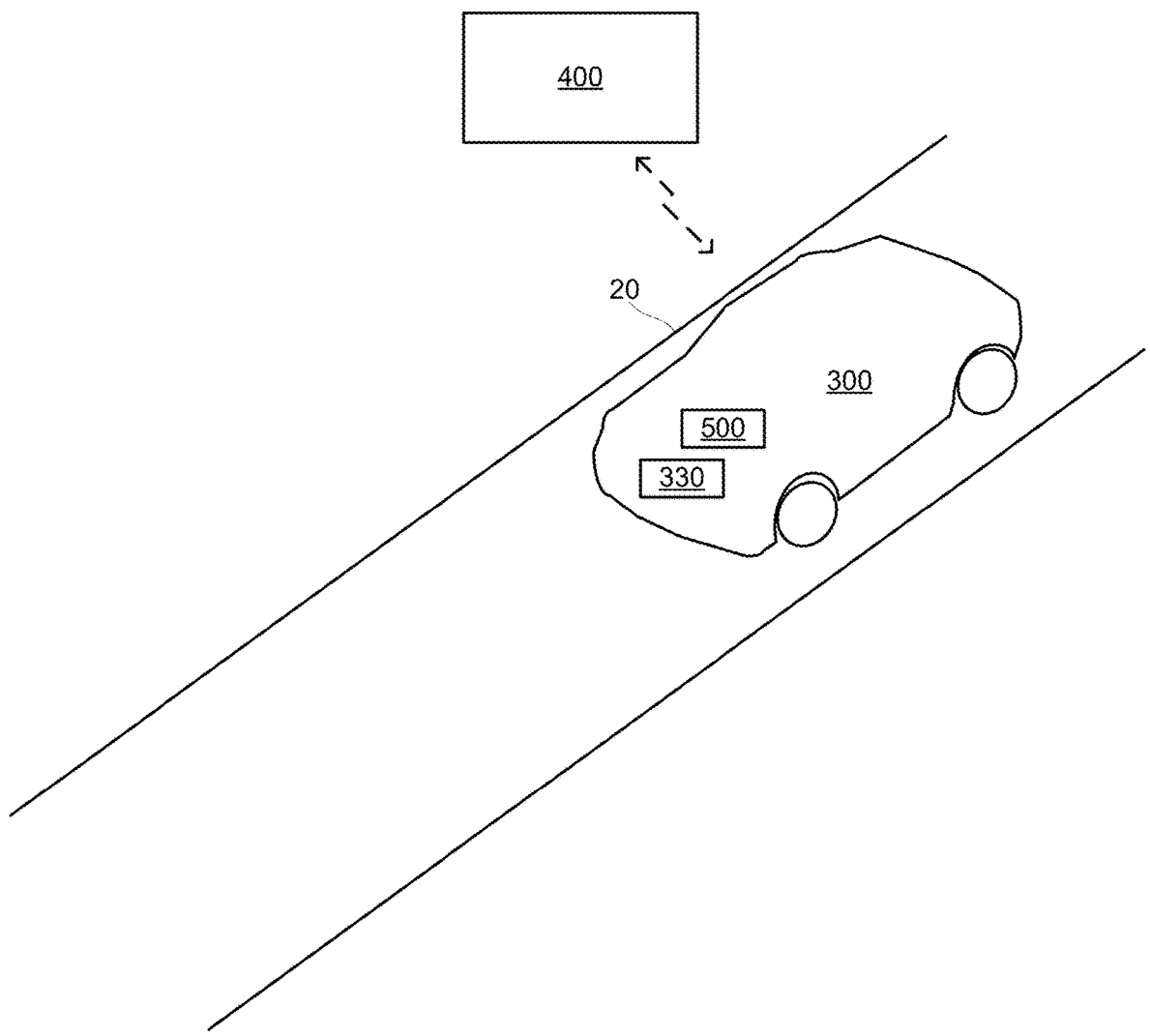
FIG. 4 is a partly-pictorial, partly-block diagram illustration of an exemplary obstacle detection and mapping system, constructed and operative in accordance with embodiments described herein.

Reference is now made to FIG. 4, which is a partly-pictorial, partly-block diagram illustration of an exemplary system 10 constructed and operative in accordance with embodiments described herein.

System 10 comprises vehicle 100 and a remote computerized system such as remote computerized system 400 which may be configured to communicate with each other over a communications network such as, for example, the Internet.

In accordance with the exemplary embodiment of FIG. 4, vehicle 100 may be configured with an autonomous driving system 200 operative to autonomously provide driving instructions to vehicle 100 without the intervention of a human driver. It will be appreciated that the embodiments described herein may also support the configuration of vehicle 100 with an assisted (or "semi-autonomous") driving system where in at least some situations a human driver may take control of vehicle 100 and/or where in at least some situations the semi-autonomous driving system provides warnings to the driver without necessarily directly controlling vehicle 100.

Remote system 400 may executed method 3000. Vehicle 10 may execute method 3100 and/or method 3102.

In accordance with the exemplary embodiment of FIG. 4, vehicle 100 may be configured with at least one sensor 130 to provide information about a current driving environment as vehicle 100 proceeds along roadway 20. It will be appreciated that while sensor 130 is depicted in FIG. 4 as a single entity, in practice, as will be described hereinbelow, there may be multiple sensors 130 arrayed on, or inside of, vehicle 130. In accordance with embodiments described herein, sensor(s) 130 may be implemented using a conventional camera operative to capture images of roadway 20 and objects in its immediate vicinity. It will be appreciated that sensor 130 may be implemented using any suitable imaging technology instead of, or in addition to, a conventional camera. For example, sensor 130 may also be operative to use infrared, radar imagery, ultrasound, electro-optics, radiography, LIDAR (light detection and ranging), etc. Furthermore, in accordance with some embodiments, one or more sensors 130 may also be installed independently along roadway 20, where information from such sensors 130 may be provided to vehicle 100 and/or computerized system 400 as a service.

In accordance with the exemplary embodiment of FIG. 4, static reference points 30A and 30B (collectively referred to hereinafter as static reference points 30) may be located along roadway 20. For example, static reference point 30A is depicted as a speed limit sign, and static reference point 30B is depicted as an exit sign. In operation, sensor 130 may capture images of static reference points 30. The images may then be processed by the autonomous driving system in vehicle 100 to provide information about the current driving environment for vehicle 100, e.g., the speed limit or the location of an upcoming exit.

Figure 5:
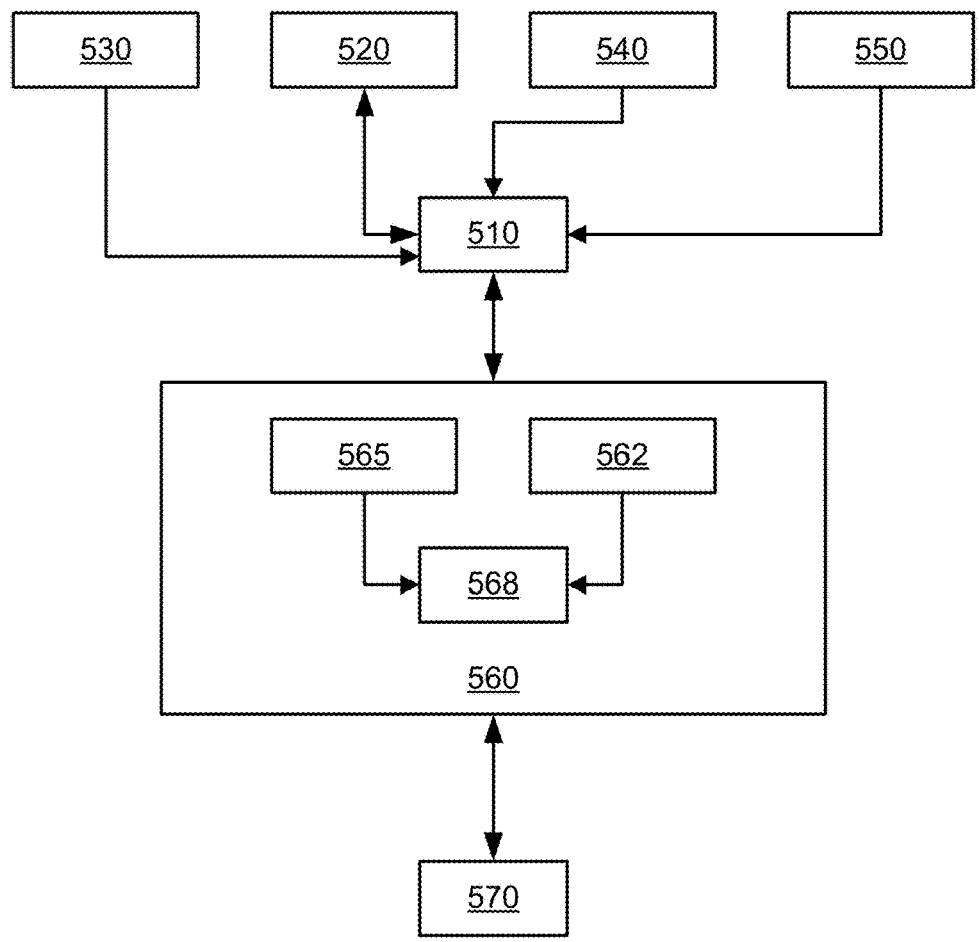
FIG. 5 is a block diagram of an exemplary autonomous driving system to be integrated in the vehicle of FIG. 4.

Reference is now made to FIG. 5 which is a block diagram of an exemplary autonomous driving system 200 (hereinafter also referred to as system 200), constructed and implemented in accordance with embodiments described herein.

Autonomous driving system 200 comprises processing circuitry 210, input/output (I/O) module 220, camera 230, telemetry ECU 240, shock sensor 250, autonomous driving manager 260, and database 270.

Autonomous driving manager 260 may be instantiated in a suitable memory for storing software such as, for example, an optical storage medium, a magnetic storage medium, an electronic storage medium, and/or a combination thereof. It will be appreciated that autonomous driving system 200 may be implemented as an integrated component of an onboard computer system in a vehicle, such as, for example, vehicle 100 from FIG. 4. Alternatively, system 200 may be implemented and a separate component in communication with the onboard computer system. It will also be appreciated that in the interests of clarity, while autonomous driving system 200 may comprise additional components and/or functionality e.g., for autonomous driving of vehicle 100, such additional components and/or functionality are not depicted in FIG. 2 and/or described herein.

Processing circuitry 210 may be operative to execute instructions stored in memory (not shown). For example, processing circuitry 210 may be operative to execute autonomous driving manager 260. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that autonomous driving system 200 may comprise more than one instance of processing circuitry 210. For example, one such instance of processing circuitry 210 may be a special purpose processor operative to execute autonomous driving manager 260 to perform some, or all, of the functionality of autonomous driving system 200 as described herein.

I/O module 220 may be any suitable communications component such as a network interface card, universal serial bus (USB) port, disk reader, modem or transceiver that may be operative to use protocols such as are known in the art to communicate either directly, or indirectly, with other elements of system 10 (FIG. 1) and/or system 200, such as, for example, computerized system 400 (FIG. 4), camera 230, telemetry ECU 240, and/or shock sensor 250. As such, I/O module 220 may be operative to use a wired or wireless connection to connect to computerized system 400 via a communications network such as a local area network, a backbone network and/or the Internet, etc. I/O module 220 may also be operative to use a wired or wireless connection to connect to other components of system 200, e.g., camera 230, telemetry ECU 240, and/or shock sensor 250. It will be appreciated that in operation I/O module 220 may be implemented as a multiplicity of modules, where different modules may be operative to use different communication technologies. For example, a module providing mobile network connectivity may be used to connect to computerized system 400, whereas a local area wired connection may be used to connect to camera 230, telemetry ECU 240, and/or shock sensor 250.

In accordance with embodiments described herein, camera 230, telemetry ECU 240, and shock sensor 250 represent implementations of sensor(s) 130 from FIG. 4. It will be appreciated that camera 230, telemetry ECU 240, and/or shock sensor 250 may be implemented as integrated components of vehicle 100 (FIG. 4) and may provide other functionality that is the interests of clarity is not explicitly described herein. As described hereinbelow, system 200 may use information about a current driving environment as received from camera 230, telemetry ECU 240, and/or shock sensor 250 to determine an appropriate driving policy for vehicle 100.

Autonomous driving manager 260 may be an application implemented in hardware, firmware, or software that may be executed by processing circuitry 210 to provide driving instructions to vehicle 100. For example, autonomous driving manager 260 may use images received from camera 230 and/or telemetry data received from telemetry ECU 240 to determine an appropriate driving policy for arriving at a given destination and provide driving instructions to vehicle 100 accordingly. It will be appreciated that autonomous driving manager 260 may also be operative to use other data sources when determining a driving policy, e.g., maps of potential routes, traffic congestion reports, etc.

As depicted in FIG. 5, autonomous driving manager 260 comprises driving event detector 265 and autonomous driving pattern module 268. It will be appreciated that the depiction of driving event detector 265 and autonomous driving pattern module 268 as integrated components of autonomous driving manager 260 may be exemplary. The embodiments described herein may also support implementation of driving event detector 265 and autonomous driving pattern module 268 as independent applications in communication with autonomous driving manager 260, e.g., via I/O module 220.

Driving event detector 265 and autonomous driving pattern module 268 may be implemented in hardware, firmware, or software and may be invoked by autonomous driving manager 260 as necessary to provide input to the determination of an appropriate driving policy for vehicle 100. For example, driving event detector 265 may be operative to use information from sensor(s) 130 (FIG. 4), e.g., camera 230, telemetry ECU 240, and/or shock sensor 250 to detect or predict the future occurrence of a driving event in (or near) the driving path of vehicle 100, e.g., along (or near) roadway 20 (FIG. 4). Driving event detector may search for driving event indicators in order to the detect or predict the future occurrence of a driving event.

Autonomous driving pattern module 268 may be operative to determine an appropriate comfort based autonomous driving pattern to be applied when detecting a future occurrence of a driving event and to apply that comfort based autonomous driving pattern.

Depending on the configuration of system 100, the information from computerized system 400 may be received in a batch update process, either periodically and/or triggered by an driving event, e.g., when vehicle 100 is turned on, when vehicle 100 enters a new map area, when vehicle 100 enters an area with good wireless reception, etc.

Figure 6:
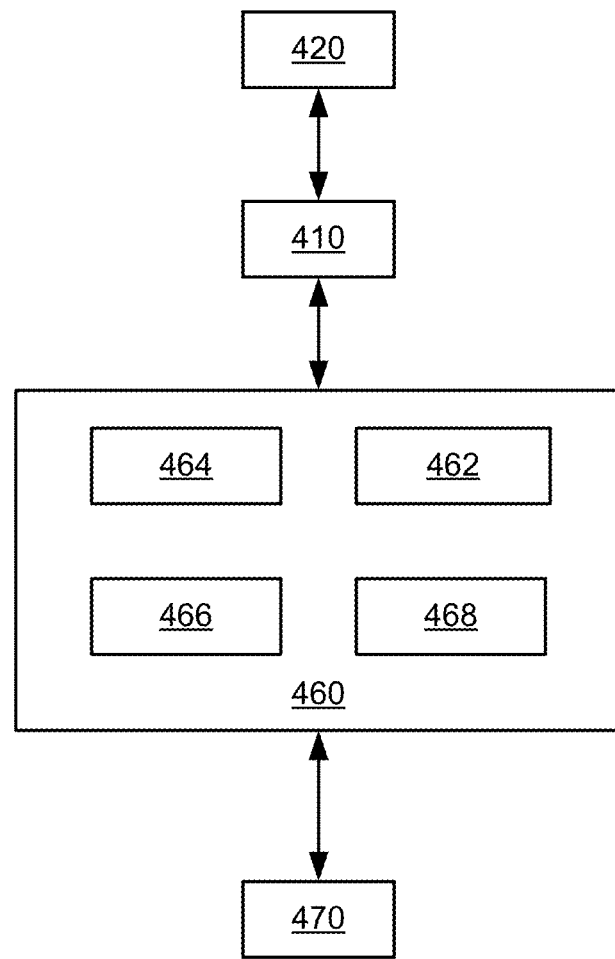
FIG. 6 is a block diagram of an computerized system.

Reference is now made to FIG. 6 which is a block diagram of a computerized system 400 (hereinafter also referred to as computerized system 400), constructed and implemented in accordance with embodiments described herein.

Computerized system 400 comprises processing circuitry 410, input/output (I/O) module 420, comfort based autonomous driving pattern manager 460, and database 470. Comfort based autonomous driving pattern manager 460 may be instantiated in a suitable memory for storing software such as, for example, an optical storage medium, a magnetic storage medium, an electronic storage medium, and/or a combination thereof.

Processing circuitry 410 may be operative to execute instructions stored in memory (not shown). For example, processing circuitry 410 may be operative to execute comfort based autonomous driving pattern manager 460. It will be appreciated that processing circuitry 410 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that computerized system 400 may comprise more than one instance of processing circuitry 410. For example, one such instance of processing circuitry 410 may be a special purpose processor operative to execute the comfort based autonomous driving pattern manager 460 to perform some, or all, of the functionality of computerized system 400 as described herein.

I/O module 420 may be any suitable communications component such as a network interface card, universal serial bus (USB) port, disk reader, modem or transceiver that may be operative to use protocols such as are known in the art to communicate either directly, or indirectly, with other elements of system 10 (FIG. 4) such as, for example, system 200 (FIG. 5). As such, I/O module 420 may be operative to use a wired or wireless connection to connect to system 200 via a communications network such as a local area network, a backbone network and/or the Internet, etc. It will be appreciated that in operation I/O module 220 may be implemented as a multiplicity of modules, where different modules may be operative to use different communication technologies. For example, a module providing mobile network connectivity may be used to connect wirelessly to one instance of system 200, e.g., one vehicle 100 (FIG. 4), whereas a local area wired connection may be used to connect to a different instance of system 100, e.g., a different vehicle 100.

Comfort based autonomous driving pattern manager 460 may be an application implemented in hardware, firmware, or software that may be executed by processing circuitry 410 to provide driving event identifiers and tailored comfort based autonomous driving pattern information for each one of the multiple types of driving events.

As depicted in FIG. 4, comfort based autonomous driving pattern manager 460 may include driving event detector 462 and comfort based autonomous driving pattern generator 468.

It will be appreciated that the depiction of driving event detector 462, and comfort based autonomous driving pattern generator 468 as integrated components of autonomous driving pattern manager 460 may be exemplary. The embodiments described herein may also support implementation of driving event detector 462, and comfort based autonomous driving pattern generator 468 as independent applications in communication with autonomous driving pattern manager 460, e.g., via I/O module 420.

Driving event detector 462 and comfort based autonomous driving pattern generator 468 may be implemented in hardware, firmware, or software and may be invoked by autonomous driving pattern manager 460 as necessary to provide obstacle warnings and associated driving policies to vehicles 100. For example, Autonomous driving pattern manager 460 may store driving event metadata received from a vehicle in database 270 for use by driving event detector 462, and comfort based autonomous driving pattern generator 468.

Each one of FIGS. 7-18 may illustrate a learning process and/or an applying process.

During the learning process the vehicle may encounter driving events, driving information and Environmental metadata indicative of information sensed by the vehicle generated by the vehicle and sent to the—that may apply method 2000.

During an applying process the vehicle may benefit from the products of the learning process- and may execute method 3100 and/or 3102.

Thus each one of FIGS. 7-18 may illustrate different driving events of different driving events that once detected by the vehicle—the vehicle may apply comfort based autonomous driving patterns.

For simplicity of explanation the following text may refer to one of these processes.

Figure 7:
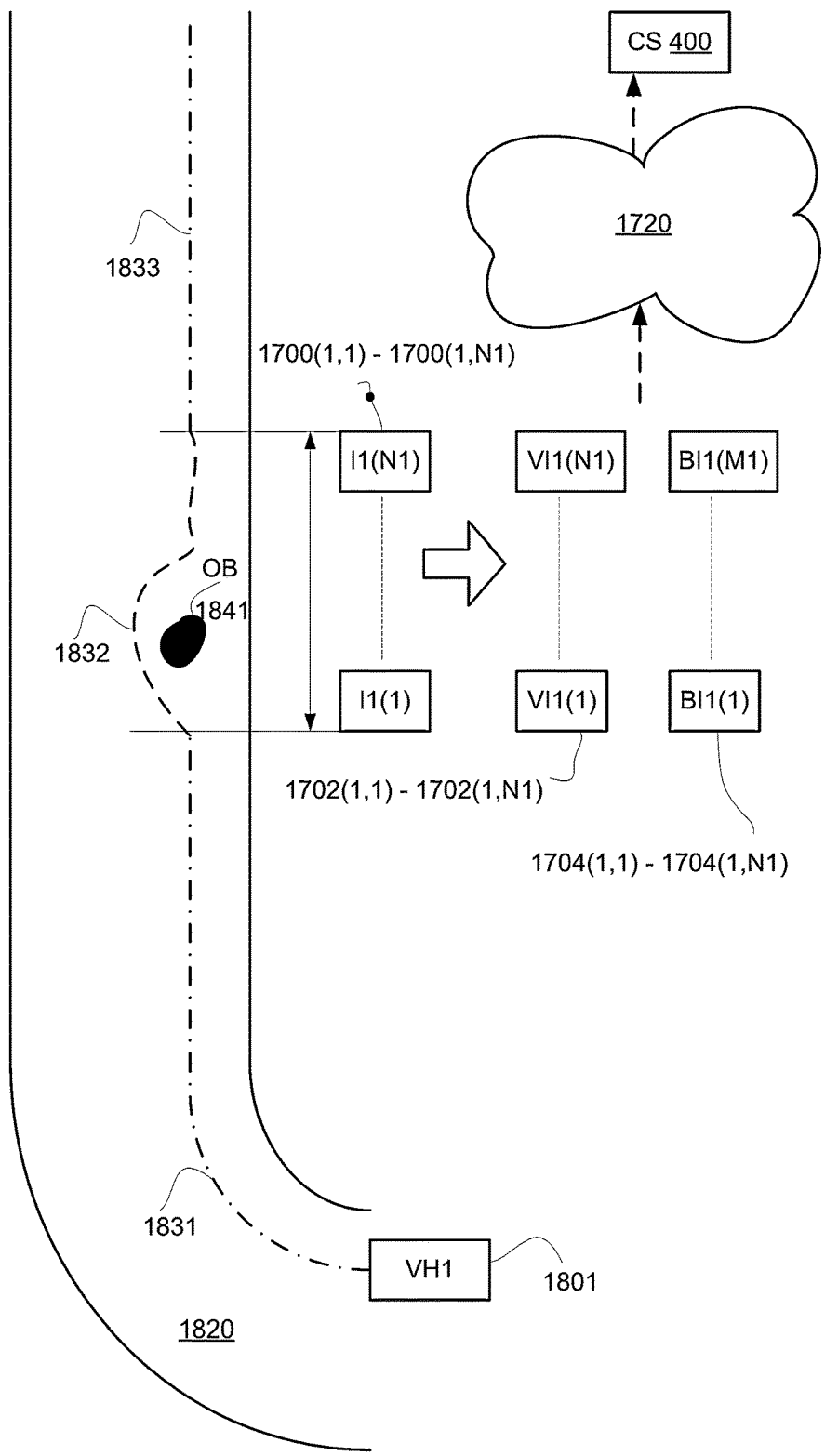

FIG. 7 illustrates a first vehicle (VH1) 1801 that propagates along a road 1820. First vehicle 1801 performs a maneuver 1832 that is suspected as being an obstacle avoidance maneuver when encountered with obstacle 1841. Maneuver 1832 is preceded by a non-suspected maneuver 1831 and is followed by another non-suspected maneuver 1833.

During a learning phase the maneuver 1832 is applied using certain driving parameters. The one or more impact parameters may be calculated based on the certain driving parameters and an evaluation of whether these one or more impact parameters have one or more allowable values can be made. Assuming that the one or more impact parameters have one or more allowable values then the comfort based autonomic driving pattern may follow the maneuver 1832 when detecting such an event in the future.

Alternatively, maneuver 1832 may be executed by an autonomous vehicle, when detecting a future occurrence of a driving over obstacle 1841.

Referring back to the learning process—the learning process may include acquiring, by first vehicle 1801 environmental metadata such as first plurality (N1) of images I1(1)-I1(N1) 1700(1,1)-1700(1,N1) during obstacle avoidance maneuver 1832.

The environmental metadata (such as visual information V1(1)-V1(N1) 1702(1,1)-1702(1,N1)) is sent from first vehicle 1801 to computerized system (CS) 400 via network 1720.

The visual information may be the images themselves. Additionally or alternatively, the first vehicle may process the images to provide a representation of the images.

First vehicle 1801 may also transmit physical metadata P1(1)-P1(N1) 1704(1,1)-1704(1,N1) obtained during maneuver 1832.

Alternatively, during an applying process, the vehicle may detect an driving event that includes the obstacle and may apply the relevant comfort based autonomous driving pattern.

Figure 8:
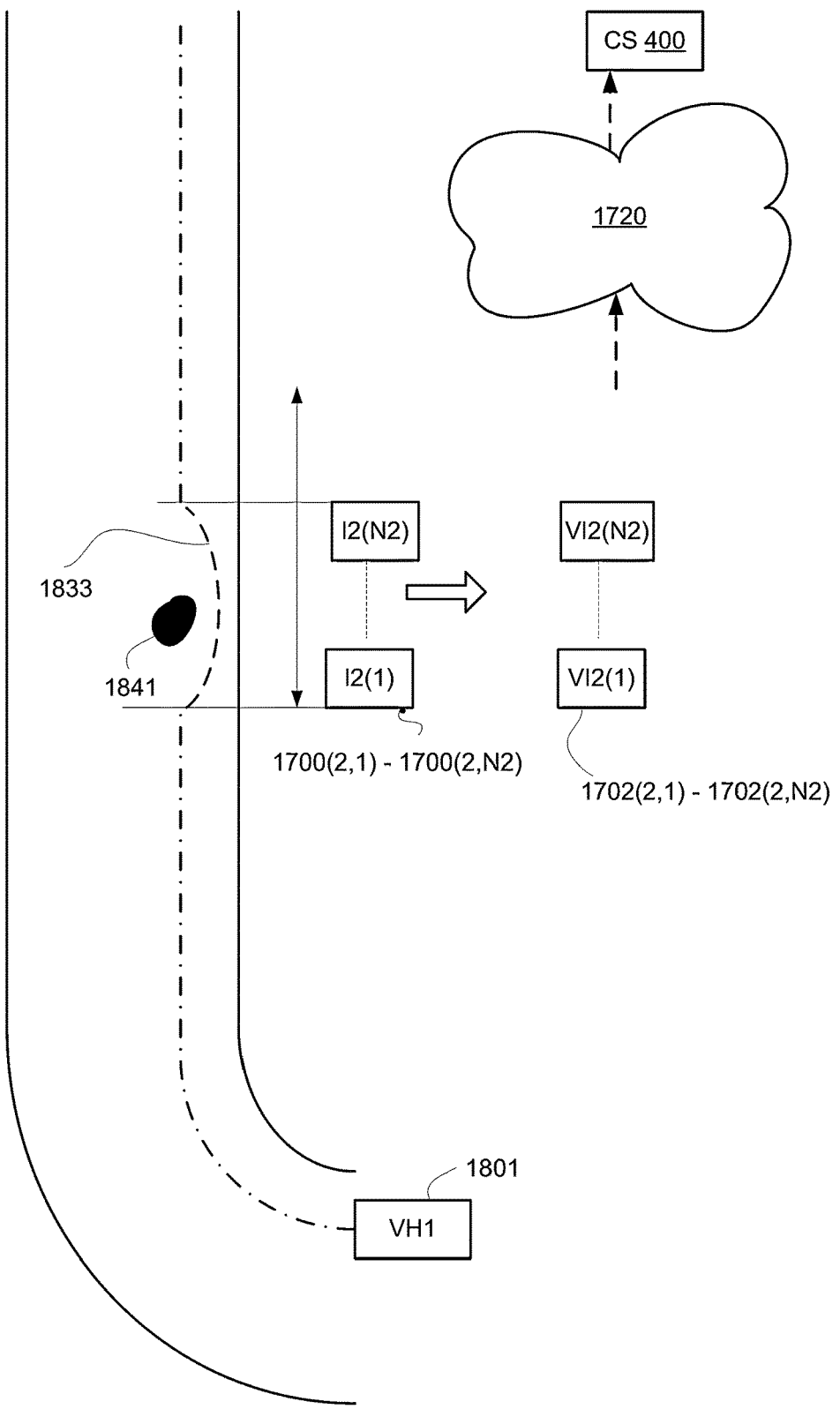

FIG. 8 illustrates VH1 1801 that propagates along a road 1820. VH1 1801 performs a maneuver 1833 suspected as being an obstacle avoidance maneuver when encountered with obstacle 1841. Maneuver 1833 is preceded by a non-suspected maneuver and is followed by another non-suspected maneuver.

VH1 1801 acquires a second plurality (N2) of images I2(1)-I2(N2) 1700(2,1)-1700(2,N2) during maneuver 1833.

Environmental metadata such as visual information V2(1)-V2(N2) 1702(2,1)-1702(2,N2) is sent from VH1 1801 to computerized system (CS) 400 via network 1720.

The visual information may be the images themselves. Additionally or alternatively, second vehicle processes the images to provide a representation of the images.

VH1 may also transmit driving information such as physical metadata (not shown) that represents the behavior of the vehicle during maneuver 1832.

Alternatively, during an applying process, the vehicle may detect an driving event that includes the obstacle and may apply the relevant comfort based autonomous driving pattern.

Figure 9:
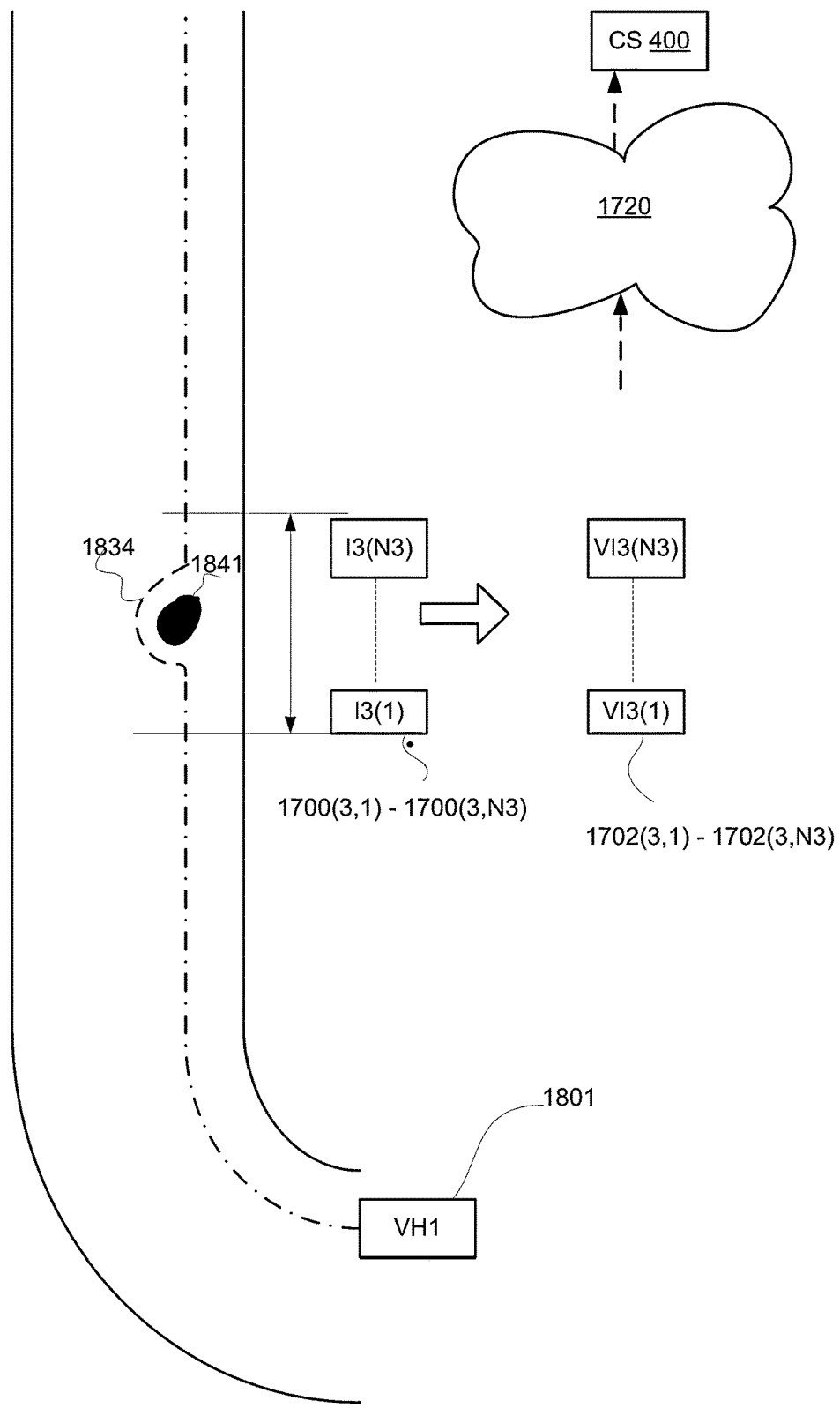
Figure 10:
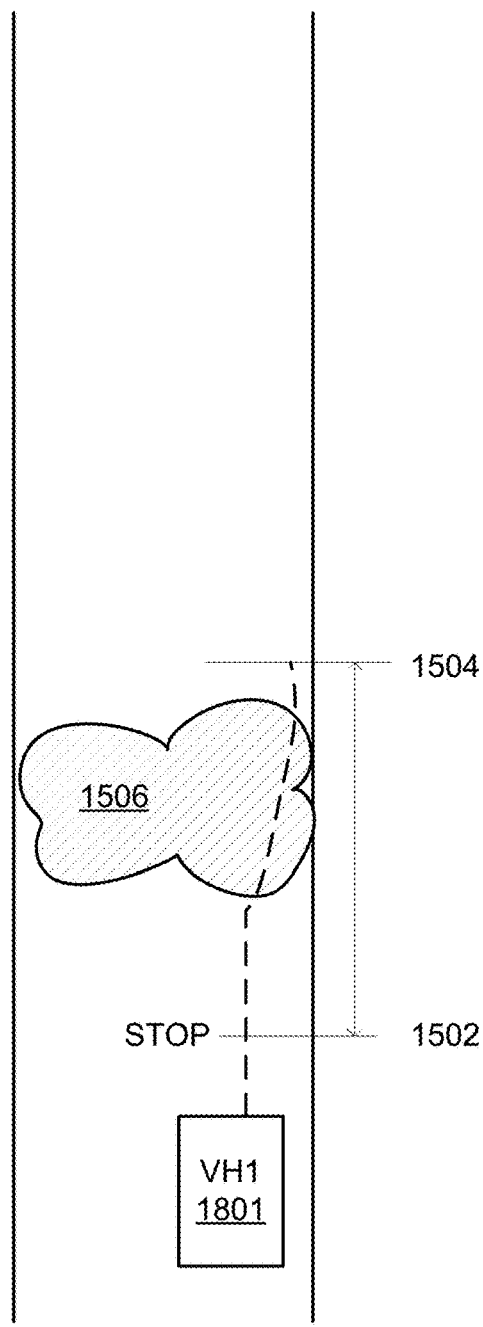

FIG. 9 illustrates VH1 1801 that propagates along a road. Third vehicle 1803 performs a maneuver 1834 suspected as being an obstacle avoidance maneuver when encountered with obstacle 1841. Maneuver 1834 is preceded by a non-suspected maneuver and is followed by another non-suspected maneuver.

VH1 acquires a third plurality (N3) of images I3(1)-I3(N3) 1700(3,1)-1700(3,N3) during maneuver 1834.

Environmental metadata such as visual information V3(1)-V3(N3) 1702(3,1)-1702(3,N3) is sent from VH1 1801 to computerized system (CS) 400 via network 1720.

The visual information may be the images themselves. Additionally or alternatively, third vehicle processes the images to provide a representation of the images.

VH1 may also transmit driving information such as physical metadata (not shown) that represents the behavior of the vehicle during maneuver 1832.

Alternatively, during an applying process, the vehicle may detect an driving event that includes the obstacle and may apply the relevant comfort based autonomous driving pattern.

Figure 10:
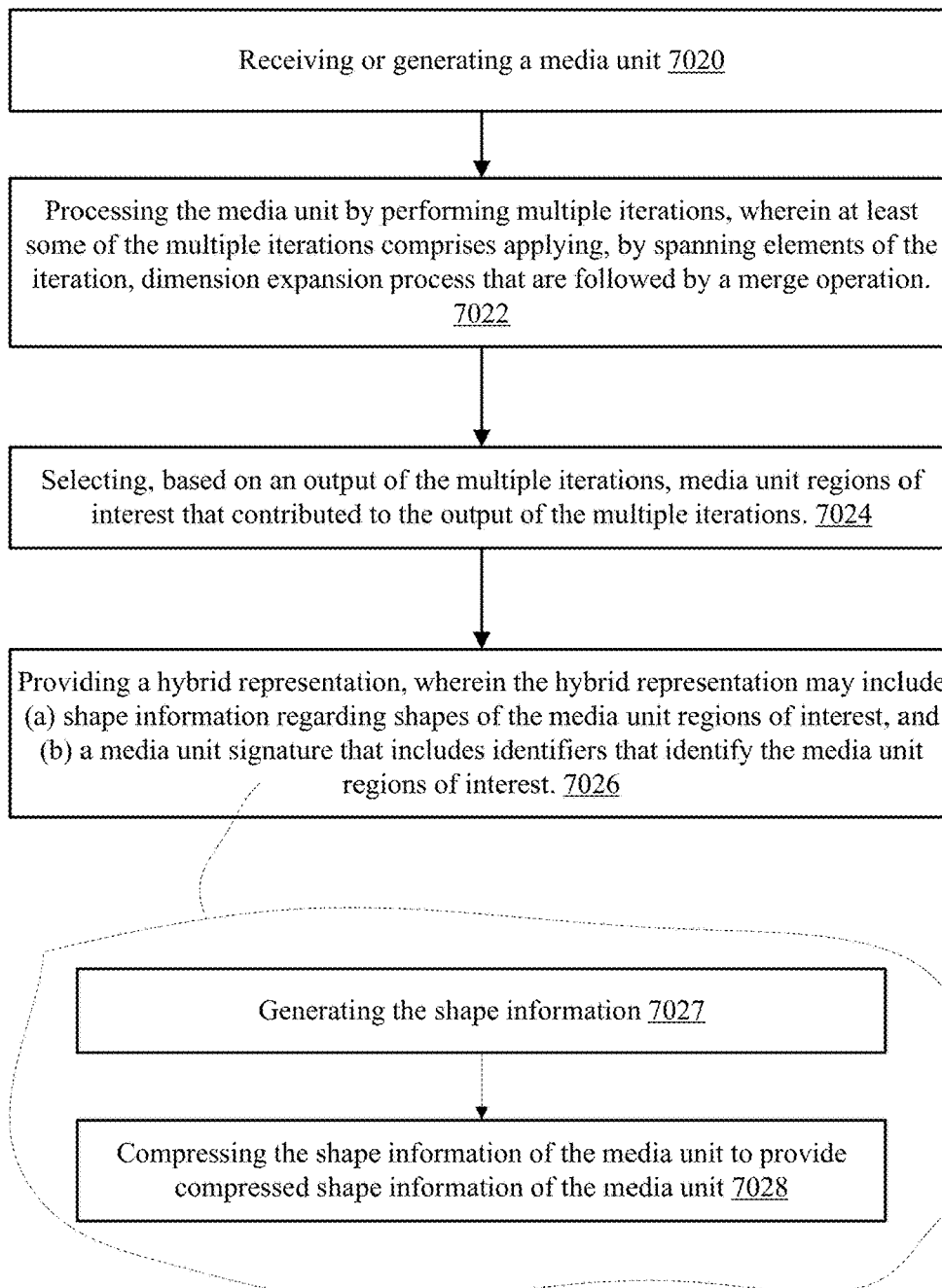
FIGS. 7-18 illustrate various examples of driving events.
Figure 1P:
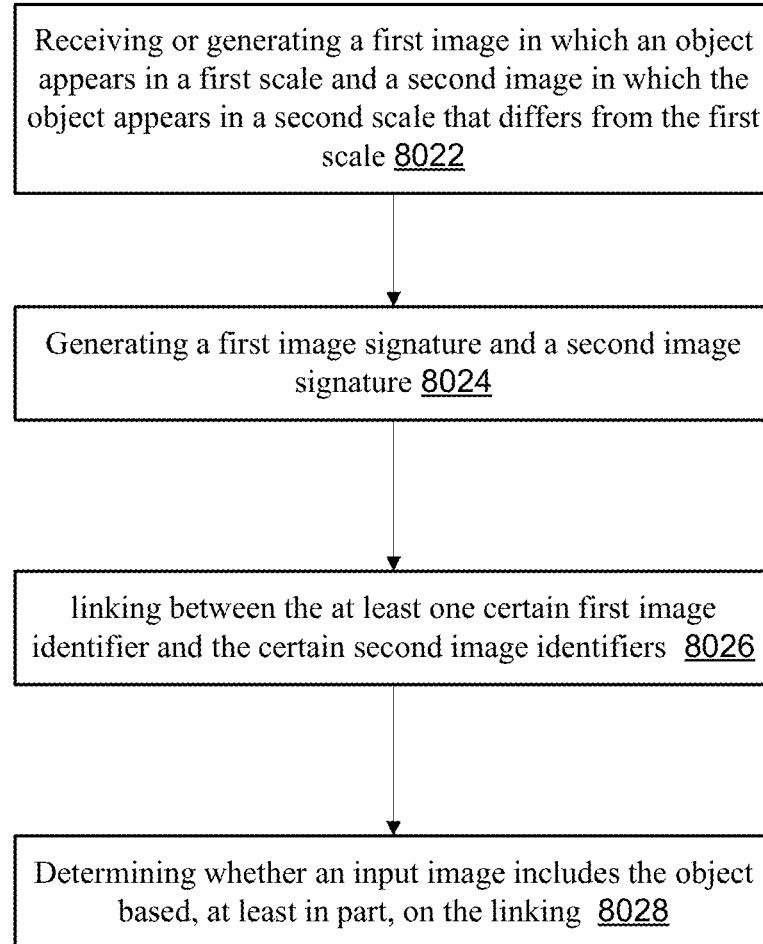
Figure 1Q:
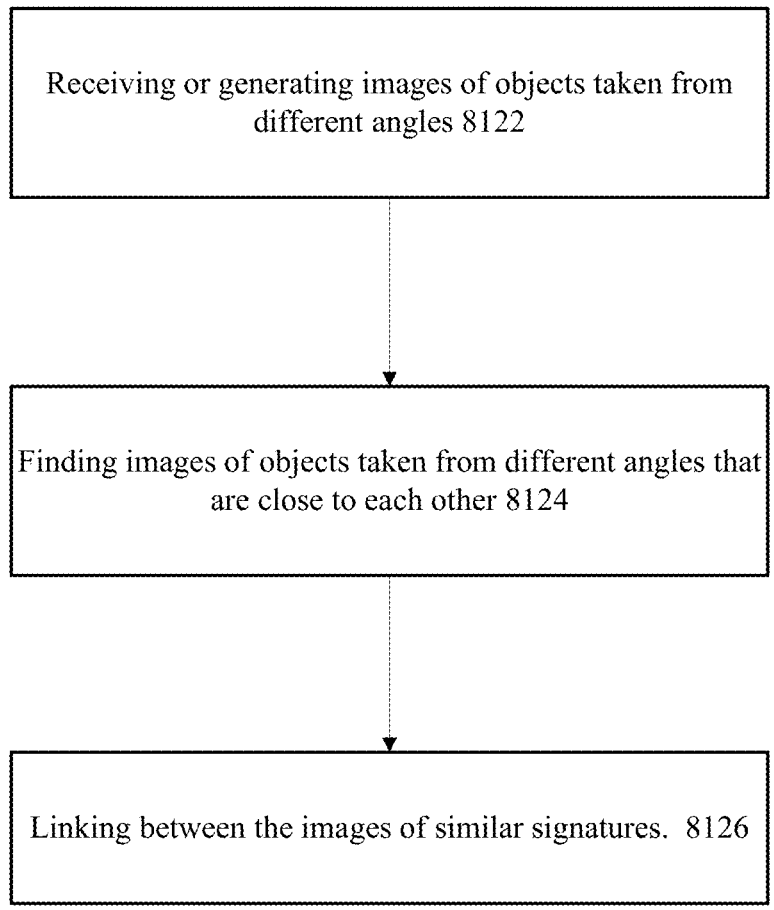

FIG. 10 illustrates first vehicle VH1 1801 as stopping (position 1502) in front of a puddle 1506 and then passing the puddle (may drive straight or change its direction till ending the maneuver at point 1504. The vehicle can generate and send driving information and Environmental metadata related to the passage over the puddle.

Figure 11:
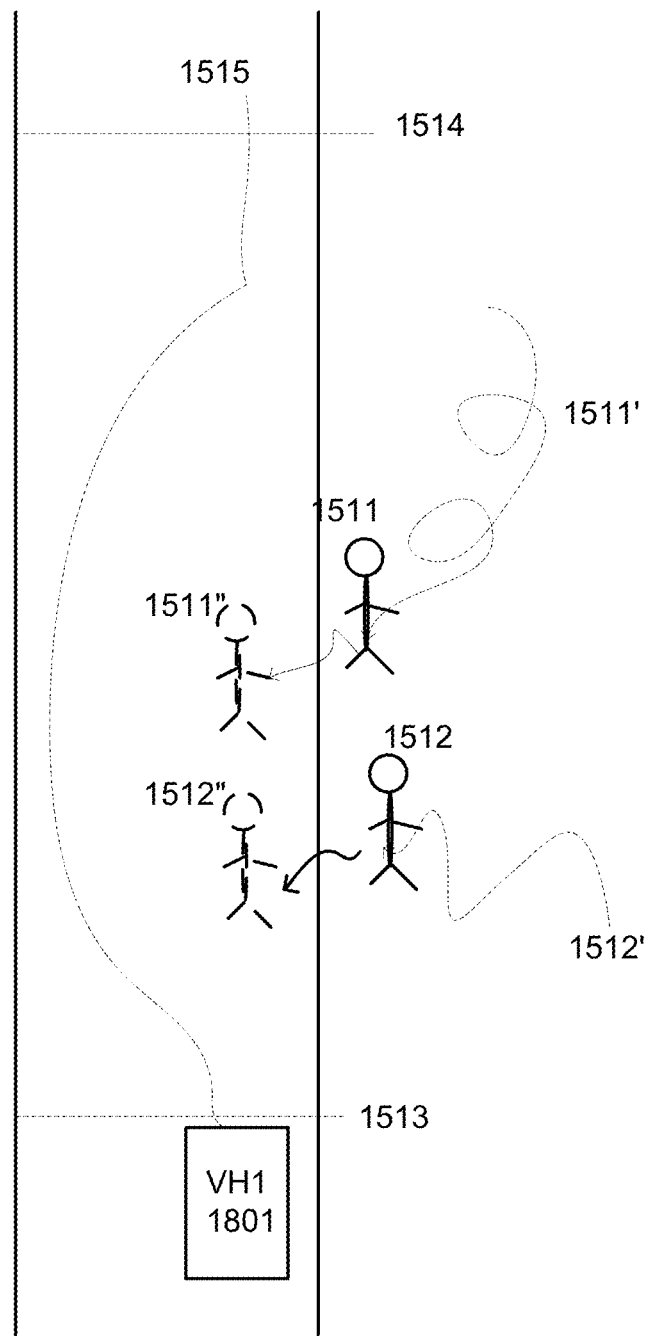

FIG. 11 illustrates first vehicle VH1 1801 as sensing pedestrians 1511 and 1512. The vehicle may sense the movements of the pedestrians—which may be regarded as sensor environmental information.

Environmental metadata such as visual information acquired between positions 1513 and 1514 (end of the maneuver) may be sent to the server.

Alternatively, during an applying process, the vehicle may detect an driving event that includes the pedestrians (and even their speed or any other parameter related to their walking pattern) parking vehicles and may apply the relevant comfort based autonomous driving pattern.

Figure 12:
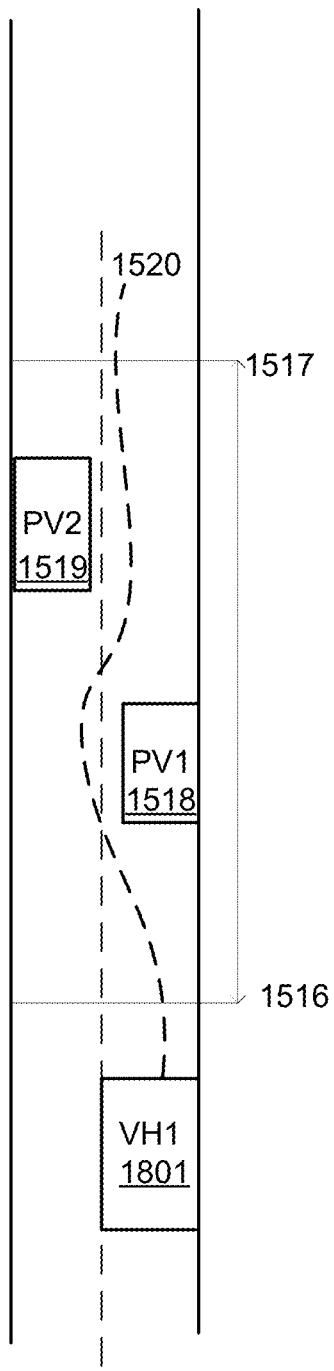

FIG. 12 illustrates first vehicle VH1 1801 as sensing parked vehicles PV1 1518 and PV2 1519 that part on both sides of a double-lane bi-directional road, that require the first vehicle to perform a complex maneuver 1520 that includes changing lanes and changing direction relatively rapidly.

Driving information and Environmental metadata related to the driving between the vehicles may be obtained and sent to the remote computer that generates a comfort based autonomous driving pattern.

Alternatively, during an applying process, the vehicle may detect an driving event that includes the parking vehicles and may apply the relevant comfort based autonomous driving pattern.

Figure 13:
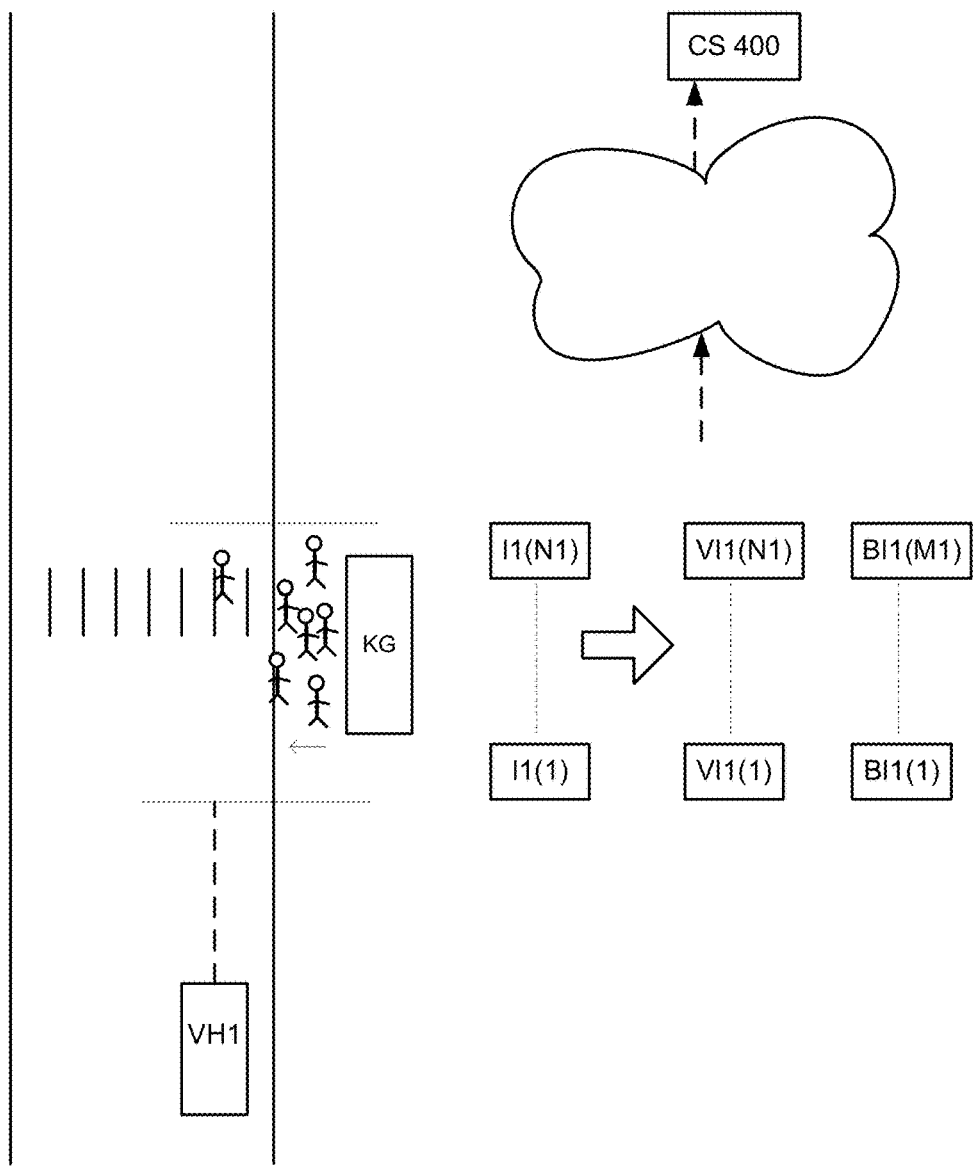

FIG. 13 illustrates a vehicle that approaches a zebra crossing located near a kindergarten and pedestrians that pass the zebra crossing.

Driving information and Environmental metadata related to the zebra crossings near the kindergarten and the pedestrians may be obtained and sent to the remote computer that generates a comfort based autonomous driving pattern.

Alternatively, during an applying process, the vehicle may detect an driving event that includes the zebra crossings near the kindergarten and the pedestrians and may apply the relevant comfort based autonomous driving pattern.

Figure 14:
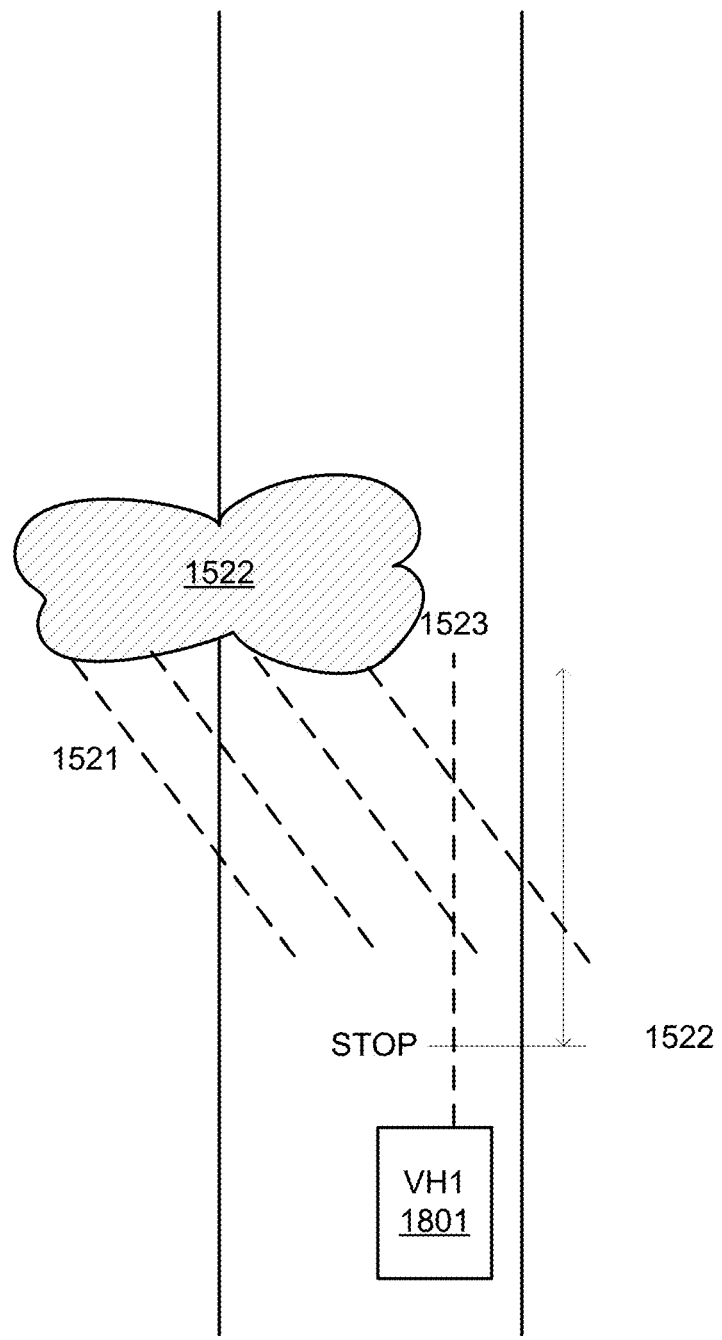

FIG. 14 illustrates first vehicle VH1 1801 as stopping (position 1522) in front of wet segment of the road on which rain 1521 (from cloud 1522) falls. The stop (at location 1522) and any further movement after moving to another part of the road may be regarded as a maneuver 1523 that is indicative that passing the wet segment may require human intervention.

Visual information acquired between position 1522 (beginning of the maneuver) and the end of the maneuver are processed during step 1494.

Figure 15:
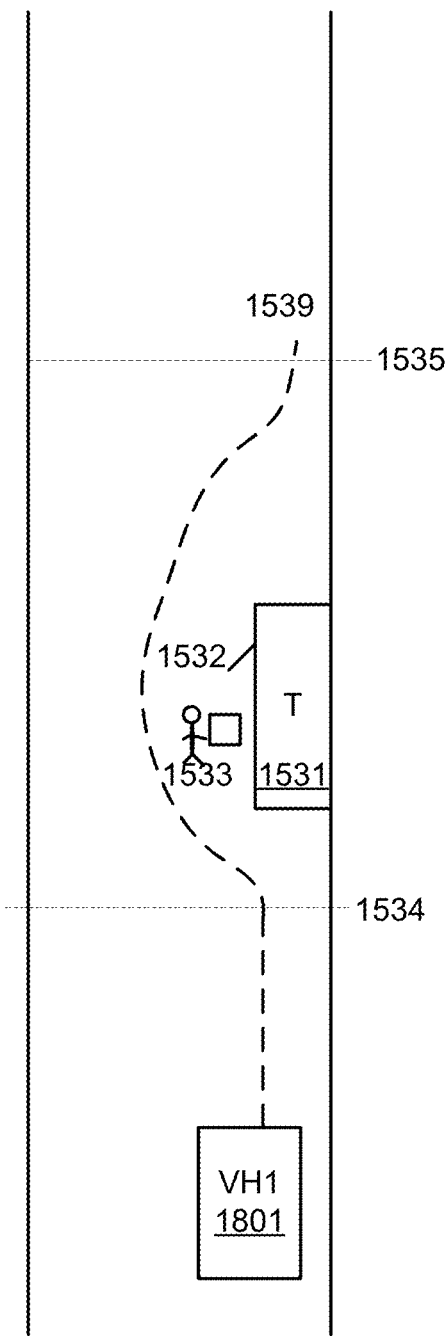

FIG. 15 illustrates first vehicle VH1 1801 as stopping (position 1534) in front of a situation that may be labeled as a packing or unpacking situation—a track 1531 is parked on the road, there is an open door 1532, and a pedestrian 1533 carries luggage on the road. The first vehicle 1801 bypasses the truck and the pedestrian between locations 1534 and 1535 during maneuver 1539. The maneuver may be indicative that a packing or unpacking situation may require human intervention.

Driving information and environmental metadata related to packing or unpacking situation may be obtained and sent to the remote computer that generates a comfort based autonomous driving pattern.

Alternatively, during an applying process, the vehicle may detect an driving event that includes packing or unpacking situation and may apply the relevant comfort based autonomous driving pattern.

Visual information acquired between positions 1534 and 1535 are processed during step 1494.

Figure 16:
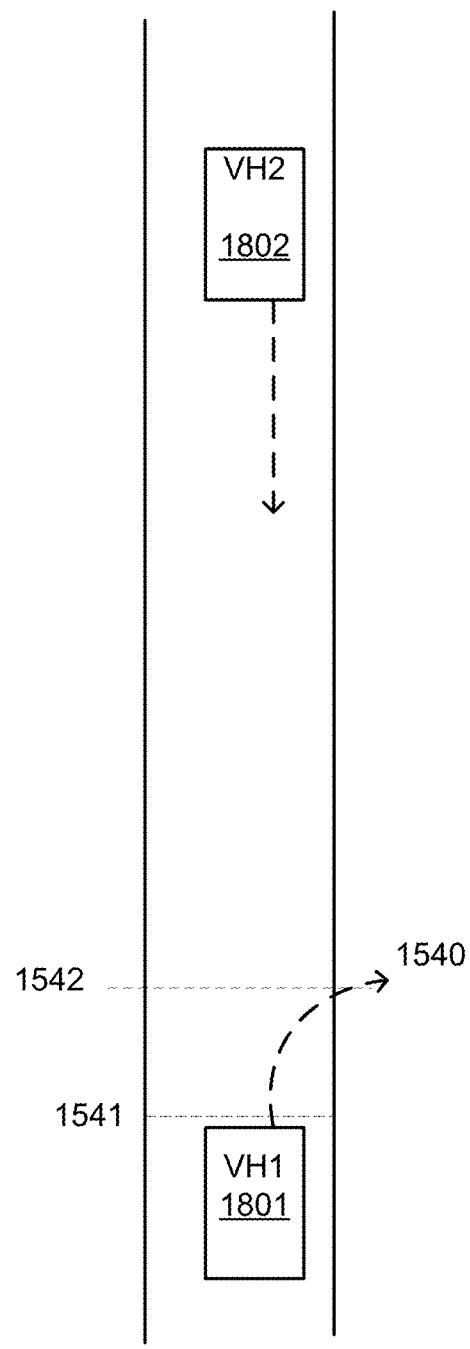

FIG. 16 illustrates first vehicle VH1 1801 as turning away (maneuver 1540) from the road when sensing that it faces a second vehicle VH2 1802 that moves towards VH1 1801.

Driving information and environmental metadata related to the potential face to face collision may be obtained and sent to the remote computer that generates a comfort based autonomous driving pattern.

Alternatively, during an applying process, the vehicle may detect an driving event that includes the potential face to face collision and may apply the relevant comfort based autonomous driving pattern.

Figure 17:
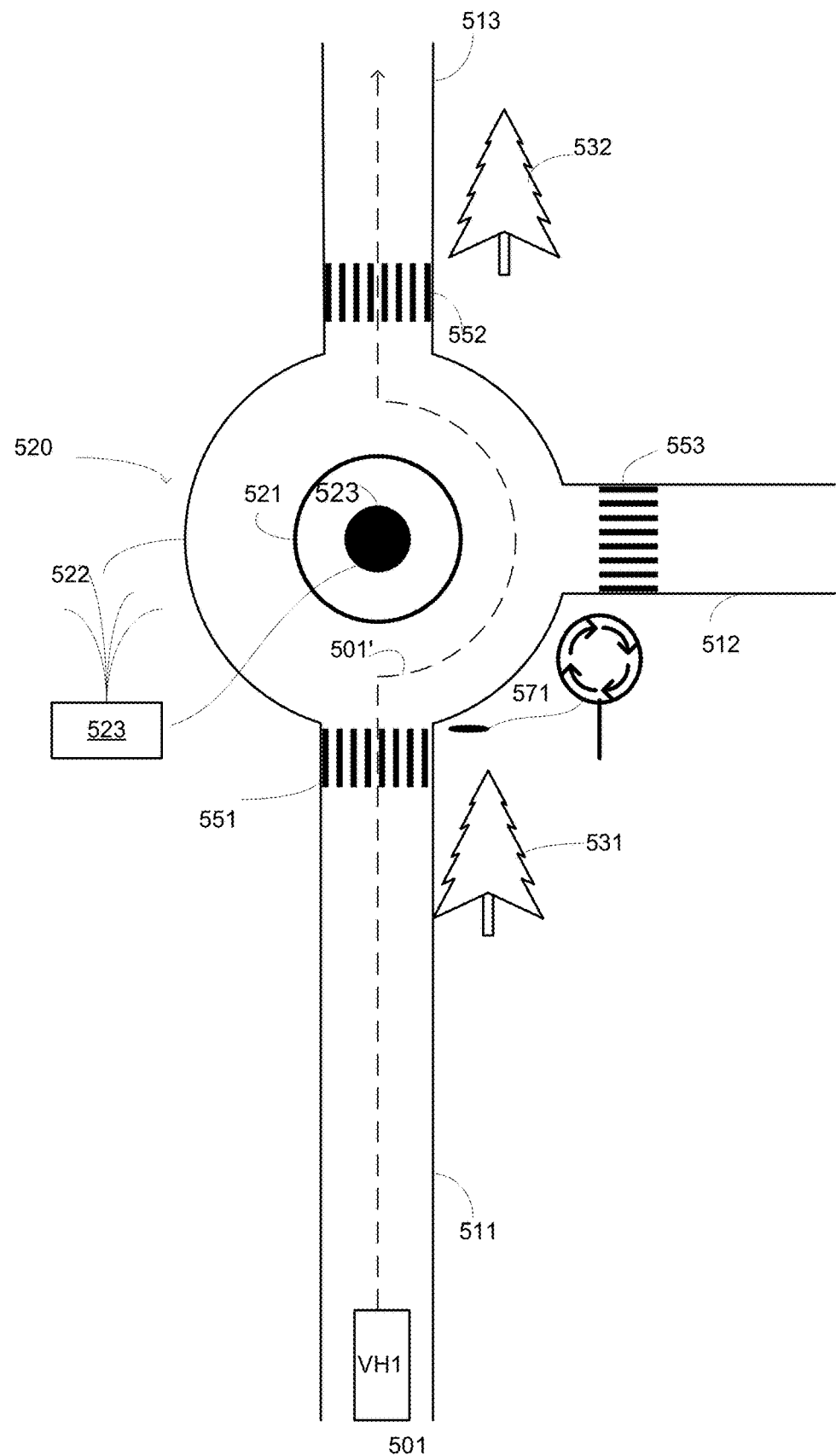

FIG. 17 illustrates first vehicle VH1 1801 as driving through a roundabout 520 that has three arms 511, 512 and 512. VH1 1801 approaches the roundabout (from arm 511), drives within the roundabout and finally exits the roundabout and drives in arm 513. The driving pattern is denoted 501'.

The roundabout 520 is preceded by a roundabout related traffic sign 571, by first tree 531 and by first zebra crossing 551. Arm 512 includes a second zebra crossing 553. Third arm includes third zebra crossing 552. A fountain 523 is positioned in the inner circle 521 of the roundabout. The roundabout has an external border 522. The roundabout is preceded by second tree 532.

Driving information and Environmental metadata related to the potential roundabout may be obtained and sent to the remote computer that generates a comfort based autonomous driving pattern.

Alternatively, during an applying process, the vehicle may detect an driving event that includes the potential roundabout and may apply the relevant comfort based autonomous driving pattern.

The roundabout (or more exactly driving through a roundabout or approaching a roundabout) may be regarded as an driving event. Alternatively an driving event may be defined per the roundabout and one or more other features related to the roundabout—such as the number of arms, the relative position of the arms, the size of the roundabout, the number of cross roads, the size of the inner circle, the fountain in the center of the roundabout, and the like.

Figure 18:
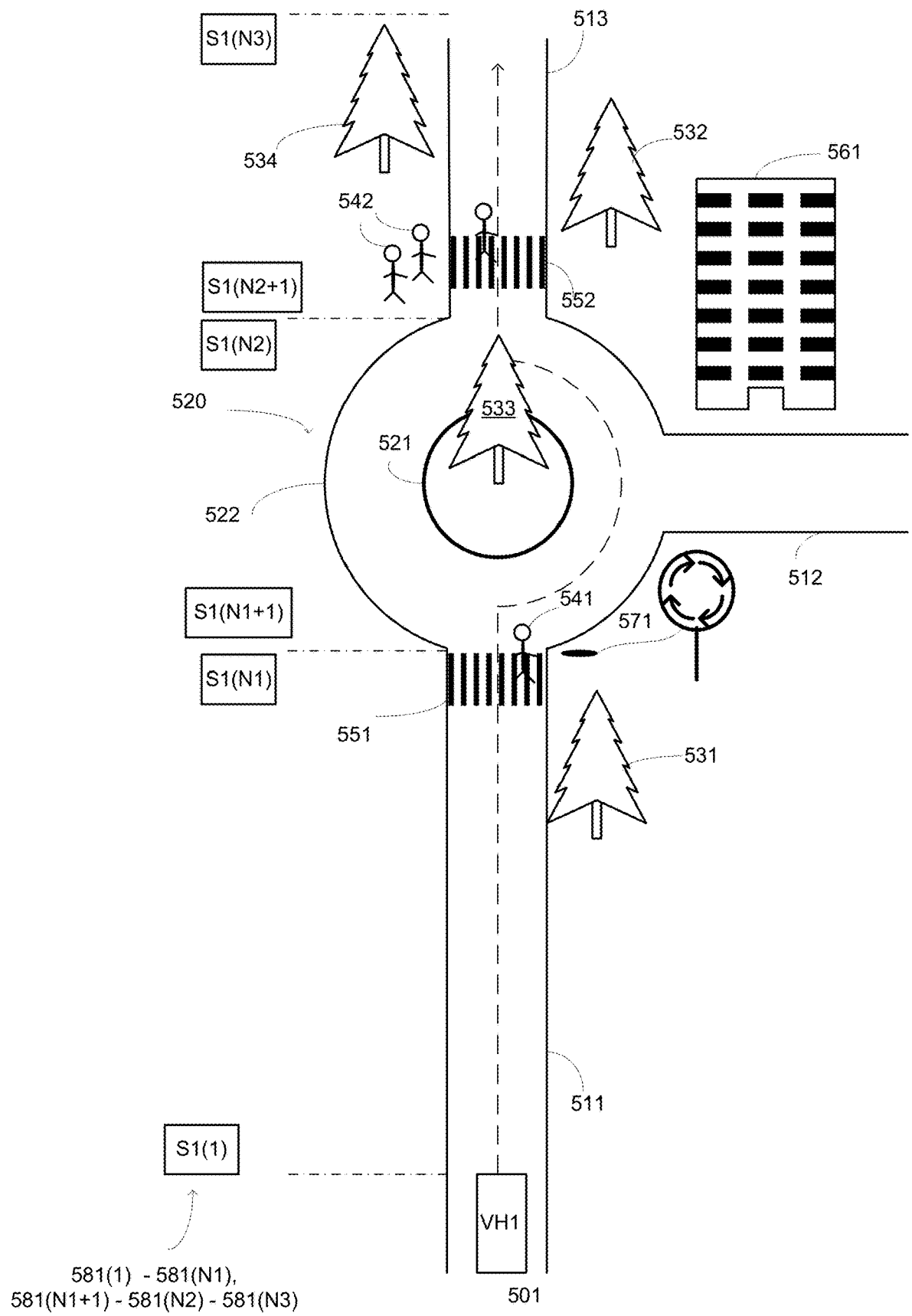

FIG. 18 illustrates first vehicle VH1 1801 as driving through a roundabout 520 that has three arms 511, 512 and 512. VH1 1801 approaches the roundabout (from arm 511), drives within the roundabout and finally exits the roundabout and drives in arm 513. The driving pattern is denoted 501'. FIG. 18 also illustrates pedestrians 541 and 542 that cross first and third zebra crossings 551 and 552 respectively.

FIGS. 18 and 17 may describe an driving event of the same type—but these figures may represent different driving events—due to the presence of pedestrians in FIG. 18.

FIG. 18 also illustrates environmental metadata generated by the vehicle—581(1)-581(N1), 581(N1+1)-581(N2)-581(N3).

In any of the methods any of the autonomous driving pattern related to The driving event may be amended based on feedback provided by users of the vehicle.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for configuring a cabin of a vehicle, the method comprises:
    identifying a group of persons in the vehicle; wherein the group of persons comprises a first person and a second person that differs from the first person;
    feeding, to a first machine learning process, sensed information indicative of an environment of the vehicle;
    configuring the cabin, using the first machine learning process, based on information pertaining to the first person and the sensed information, by configuring an in-cabin system associated with the cabin;
    feeding, to a second machine learning process, the sensed information; and
    at least partially controlling, by the second machine learning process, the driving of the vehicle by outputting vehicle control-related decisions, based on information pertaining to the second person and the sensed information; wherein the second machine learning process was trained to map the information pertaining to the second person and the sensed information to the vehicle control-related decisions, such that the sensed information effects both the controlling of the cabin and the controlling of the driving of the vehicle, using the first machine learning process and the second machine learning process respectively.

2. The method according to claim 1 wherein the at least partially controlling the driving of the vehicle comprises autonomously driving the vehicle.

3. The method according to claim 1 wherein the at least partially controlling the driving of the vehicle comprising applying one or more advance driving assistance measures.

4. The method according to claim 1 wherein the second person is a driver of the vehicle.

5. The method according to claim 1 comprising configuring a vehicle multimedia system.

6. The method according to claim 1 wherein the at least partially controlling is also based on a driving feature that is an autonomous driving pattern.

7. The method according to claim 1 wherein the at least partially controlling is also based on a driving feature selected out of maximal acceleration, maximal deceleration, maximal speed, maximal breaking strength, minimal distance to a preceding vehicle, a lane crossing parameter, and a bypass parameter.

8. The method according to claim 1 wherein the at least partially controlling is also based on a minimal distance to a preceding vehicle.

9. The method according to claim 1 wherein the at least partially controlling is also based on a lane crossing parameter.

10. The method according to claim 1 wherein the at least partially controlling is also based on a bypass parameter.

11. The method according to claim 1 comprising configuring a temperature control system, a vehicle multimedia system, an in-cabin lighting system, and at least one movable element within the cabin.

12. The method according to claim 1 comprising configuring an in-cabin lighting system.

13. A non-transitory computer readable medium that stores instructions that once executed by a processor causes a processor to:
    identifying a group of persons in the vehicle; wherein the group of persons comprises a first person and a second person that differs from the first person;
    feeding, to a first machine learning process, sensed information indicative of an environment of the vehicle;
    configuring the cabin, using the first machine learning process, based on information pertaining to the first person and the sensed information, by configuring an in-cabin system associated with the cabin;
    feeding, to a second machine learning process, the sensed information; and
    at least partially controlling, by the second machine learning process, the driving of the vehicle by outputting vehicle control-related decisions, based on information pertaining to the second person and the sensed information; wherein the second machine learning process was trained to map the information pertaining to the second person and the sensed information to the vehicle control-related decisions, such that the sensed information effects both the controlling of the cabin and the controlling of the driving of the vehicle, using the first machine learning process and the second machine learning process respectively.

14. The non-transitory computer readable medium according to claim 13 wherein the at least partially controlling the driving of the vehicle comprises autonomously driving the vehicle.

15. The non-transitory computer readable medium according to claim 13 wherein the at least partially controlling the driving of the vehicle comprising applying one or more advance driving assistance measures.

16. The non-transitory computer readable medium according to claim 13 wherein the second person is a driver of the vehicle.

17. The non-transitory computer readable medium according to claim 13 that stores instructions for configuring a vehicle multimedia system.

18. The non-transitory computer readable medium according to claim 13 wherein the least partially controlling is also based on a driving feature that is an autonomous driving pattern.

19. The non-transitory computer readable medium according to claim 13 wherein the least partially controlling is also based on a driving feature selected out of maximal acceleration, maximal deceleration, maximal speed, maximal breaking strength, minimal distance to a preceding vehicle, a lane crossing parameter, and a bypass parameter.

20. The non-transitory computer readable medium according to claim 13 wherein the at least partially controlling is also based on a minimal distance to a preceding vehicle.

* * * * *